(12) United States Patent
Shi et al.

(10) Patent No.: US 11,232,767 B2
(45) Date of Patent: Jan. 25, 2022

(54) IMAGE DISPLAY METHOD, DISPLAY SYSTEM AND COMPUTER-READABLE STORAGE MEDIUM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Tiankuo Shi, Beijing (CN); Xiaomang Zhang, Beijing (CN); Bin Dai, Beijing (CN); Lingyun Shi, Beijing (CN); Wei Sun, Beijing (CN); Bo Gao, Beijing (CN); Yue Li, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 515 days.

(21) Appl. No.: 16/309,355

(22) PCT Filed: Apr. 9, 2018

(86) PCT No.: PCT/CN2018/082294
§ 371 (c)(1),
(2) Date: Dec. 12, 2018

(87) PCT Pub. No.: WO2019/029177
PCT Pub. Date: Feb. 14, 2019

(65) Prior Publication Data
US 2021/0225329 A1 Jul. 22, 2021

(30) Foreign Application Priority Data
Aug. 9, 2017 (CN) .......................... 201710674693.6

(51) Int. Cl.
G09G 5/373 (2006.01)
G06T 3/40 (2006.01)
G06F 3/01 (2006.01)

(52) U.S. Cl.
CPC ............... G09G 5/373 (2013.01); G06T 3/40 (2013.01); G06F 3/013 (2013.01); G09G 2340/02 (2013.01); G09G 2340/0407 (2013.01)

(58) Field of Classification Search
CPC ............... G09G 5/373; G09G 2340/02; G09G 2340/0407; G06T 3/40
See application file for complete search history.

(56) References Cited

U.S. PATENT DOCUMENTS 10,803,829 B2 * 10/2020 Harada ................ G09G 3/3413
2008/0290794 A1 * 11/2008 Yuasa ................ H01L 27/3211
313/504
(Continued)

FOREIGN PATENT DOCUMENTS

CN 103745448 A 4/2014
CN 103886825 A 6/2014
(Continued)

OTHER PUBLICATIONS

Display Daily; "BOE Shows a Wide Range of Panels"; May 31, 2016; SID Display Week 2016; vol. 23, Issue 21 (Year: 2016).*
(Continued)

Primary Examiner — David T Welch
(74) Attorney, Agent, or Firm — Collard & Roe, P.C.

(57) ABSTRACT

An image display method, a display system, and a computer-readable storage medium are disclosed. The image display method includes: acquiring a first image; determining a first region and a second region in the first image; performing a first rendering algorithm on the first region in the first image
(Continued)

and performing a second rendering algorithm on the second region in the first image, so as to obtain a second image, where a rendering resolution of the first rendering algorithm is greater than a rendering resolution of the second rendering algorithm; and displaying the second image.

17 Claims, 6 Drawing Sheets

(56) References Cited

U.S. PATENT DOCUMENTS

| | | | |
|---|---|---|---|
| 2012/0189221 A1* | 7/2012 | Inada | G06T 11/40 382/240 |
| 2012/0268465 A1* | 10/2012 | Inada | G11B 27/329 345/428 |
| 2014/0368494 A1 | 12/2014 | Sakharnykh et al. | |
| 2015/0371583 A1 | 12/2015 | Guo et al. | |
| 2016/0234488 A1 | 8/2016 | Zhao et al. | |
| 2016/0307297 A1* | 10/2016 | Akenine-Moller | G02B 27/017 |
| 2017/0041502 A1* | 2/2017 | Fuse | G06T 1/60 |
| 2017/0094163 A1* | 3/2017 | Ohba | G06K 9/00 |
| 2017/0178408 A1 | 6/2017 | Bavor, Jr. et al. | |
| 2018/0336660 A1 | 11/2018 | Gu | |
| 2018/0336867 A1 | 11/2018 | Gu et al. | |
| 2019/0355332 A1* | 11/2019 | Knez | G09G 3/20 |
| 2019/0362063 A1 | 11/2019 | Wu | |
| 2020/0034947 A1* | 1/2020 | Wang | G06F 3/1454 |
| 2020/0388002 A1* | 12/2020 | Jung | H04N 13/178 |

FOREIGN PATENT DOCUMENTS

| | | |
|---|---|---|
| CN | 106373537 A | 2/2017 |
| CN | 106412563 A | 2/2017 |
| CN | 106485790 A | 3/2017 |
| CN | 106980983 A | 7/2017 |
| CN | 107194890 A | 9/2017 |
| CN | 107194891 A | 9/2017 |
| EP | 2242280 A2 | 10/2010 |

OTHER PUBLICATIONS

Chinese Office Action in Chinese Application No. 201710674693.6, dated Dec. 16, 2019 with English translation.
International Search Report of PCT/CN2018/082294 in Chinese, dated May 30, 2018 with English translation.
Notice of Transmittal of the International Search Report of PCT/CN2018/082294 in Chinese, dated May 30, 2018.
Written Opinion of the International Searching Authority of PCT/CN2018/082294 in Chinese, dated May 30, 2018 with English translation.
Extended European Search Report in European Patent Application No. 18814480.2 dated Mar. 22, 2021.
Reingold et al., Gaze-Contingent Multiresolutional Displays: An Integrative Review, Human Factors, pp. 307-328, vol. 45, No. 2, Summer 2003.
STENGEL et al., Gaze-Contingent Computational Displays, IEEE Signal Processing Magazine, Sep. 2016, pp. 139-148.
Guenter et al., Foveated 3D Graphics, Microsoft Research, 10 pages.
Ohshima et al, Gaze-Directed Adaptive Rendering for Interacting with Virtual Space, Media Technology Laboratory, Canon Inc , IEEE Proceedings of VRAIS '96, pp. 103-110.

* cited by examiner

IMAGE DISPLAY METHOD, DISPLAY SYSTEM AND COMPUTER-READABLE STORAGE MEDIUM

CROSS-REFERENCE TO RELATED APPLICATION

This application is the National Stage of PCT/CN2018/082294 filed on Apr. 9, 2018, which claims priority under 35 U.S.C. § 119 of Chinese Application No. 201710674693.6 filed on Aug. 9, 2017, the disclosure of which is incorporated by reference.

TECHNICAL FIELD

The embodiments of the present disclosure relate to an image display method, a display system, and a computer-readable storage medium.

BACKGROUND

Virtual Reality (VR) is a computer simulation technology which may create and experience a virtual world. The VR technology may be applied to many fields such as medical science, amusement, games, military astronautics, exhibitions and demonstration, or the like.

With development of display technologies, demands from human for a resolution of a display device raise increasingly. A product with a high resolution (such as a 4K resolution) requires a relatively large data transmission amount, thereby reducing a refresh rate of an electronic product. The VR technology is strict in the resolution, refresh rate, or the like, for example, the VR technology requires the refresh rate up to more than 90 Hz, so as to ensure that a user would not feel dizzy. Therefore, the data transmission amount has become an urgent problem in the VR technology.

SUMMARY

At least an embodiment of the present disclosure provides an image display method, which comprises: acquiring a first image; determining a first region and a second region in the first image; performing a first rendering algorithm on the first region in the first image and performing a second rendering algorithm on the second region in the first image, so as to obtain a second image, where a rendering resolution of the first rendering algorithm is greater than a rendering resolution of the second rendering algorithm; and displaying the second image.

At least an embodiment of the present disclosure further provides a display system, which comprises a display device. The display device comprises a display panel, a first processor and a first memory. The first memory stores a first computer instruction, and following steps are implemented when the first computer instruction is executed by the first processor: acquiring a first image; determining a first region and a second region in the first image; performing a first rendering algorithm on the first region in the first image and performing a second rendering algorithm on the second region in the first image, so as to obtain a second image, where a rendering resolution of the first rendering algorithm is greater than a rendering resolution of the second rendering algorithm; and displaying the second image on the display panel.

At least an embodiment of the present disclosure further provides a computer-readable storage medium, which stores computer instructions, and the image display method according to any one of the above embodiments can be performed when the computer instructions is executed by a processor.

At least an embodiment of the present disclosure provides an image display method, a display system and a computer-readable storage medium. By performing different rendering algorithms on different display regions at the display device, the image display method achieves fixation point rendering effects, reduces the data transmission amount of the image, saves host power consumption, and increases the refresh rate of a display screen.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

Figure 1:
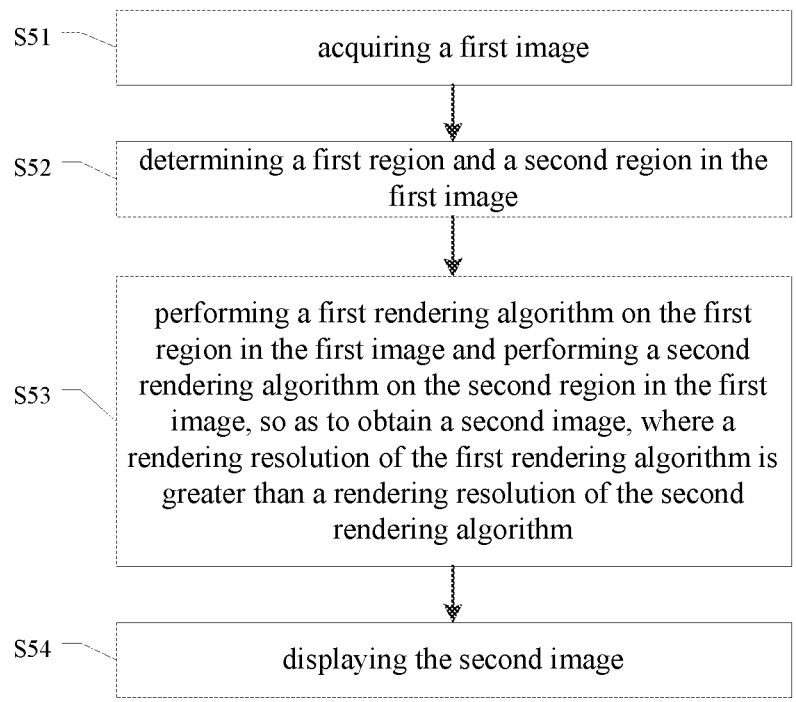
FIG. 1 is a schematic flow chart of an image display method according to an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly. In order to make following descriptions of the embodiments of the present disclosure clear and concise, the present disclosure omits detailed descriptions of known functions and known components.

Fixation point rendering technology is a selective image rendering technology, which selects a fixation region of human eyes based on an eyeball tracking technology, so as to perform full resolution rendering on the fixation region, and perform blur rendering on regions other than the fixation region of human eyes, thereby displaying an image with a clear fixation region and a blurry non-fixation region. The fixation point rendering technology achieve a goal of reducing the data transmission amount by only rendering the image of the fixation region, thereby saving computer operational resources and reducing power consumption. A VR product based on the fixation point rendering technology may reduce the data transmission amount, ease the rendering burden of the computer, and implement a high resolution and a high refresh rate.

At least one embodiment of the present disclosure provides an image display method, a display system and a computer-readable storage medium. By performing different rendering algorithms on different display regions at the display device, the image display method achieves fixation point rendering effects, reduces the data transmission amount of the image, saves host power consumption, and increases the refresh rate of a display screen.

The embodiments of the present disclosure are described in detail below with reference to the accompanying drawings; however the present disclosure is not limited to these specific embodiments.

Figure 2A:
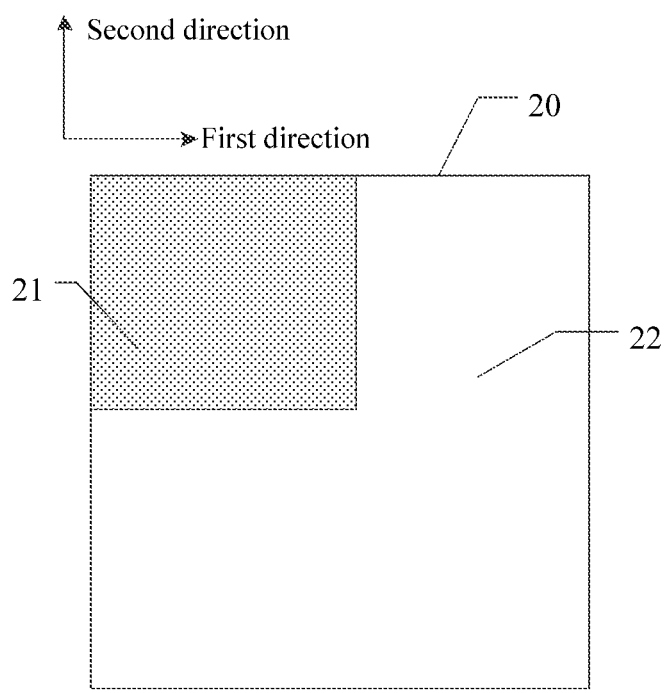
FIGS. 2A and 2B are schematic diagrams of a first region and a second region in first images according to an embodiment of the present disclosure.
Figure 2B:
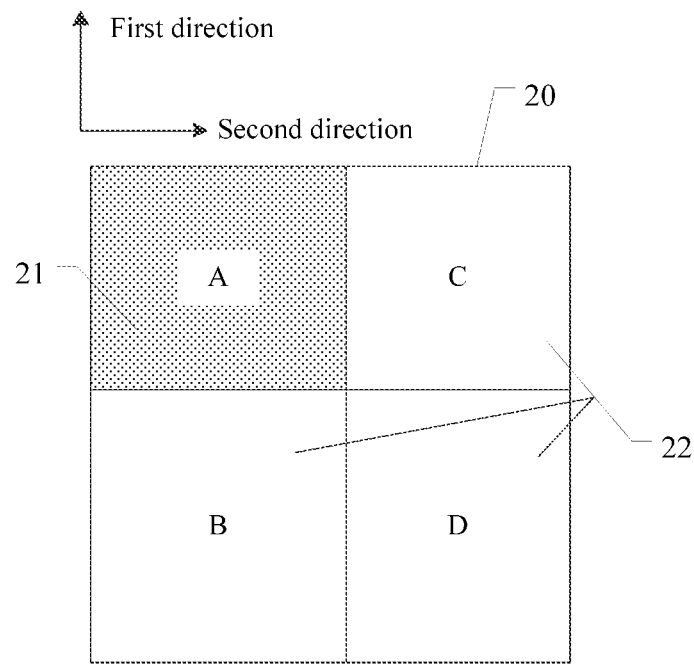
Figure 3:
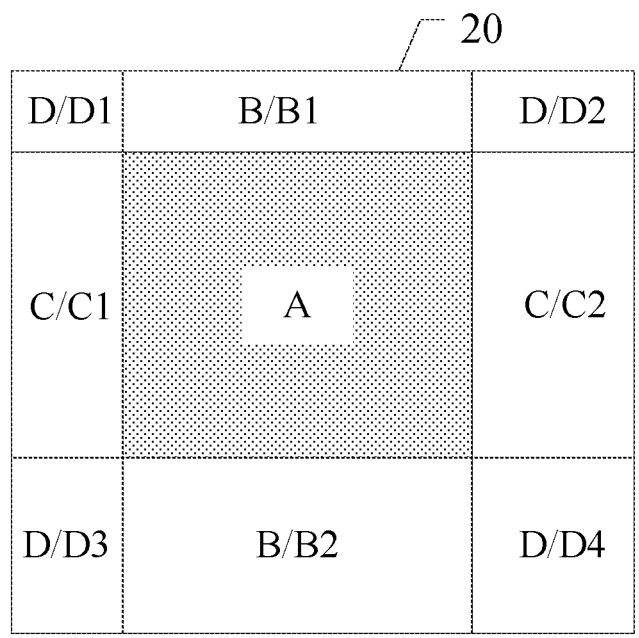
FIG. 3 is a schematic diagram of a first region and a second region in a first image according to another embodiment of the present disclosure.
Figure 4:
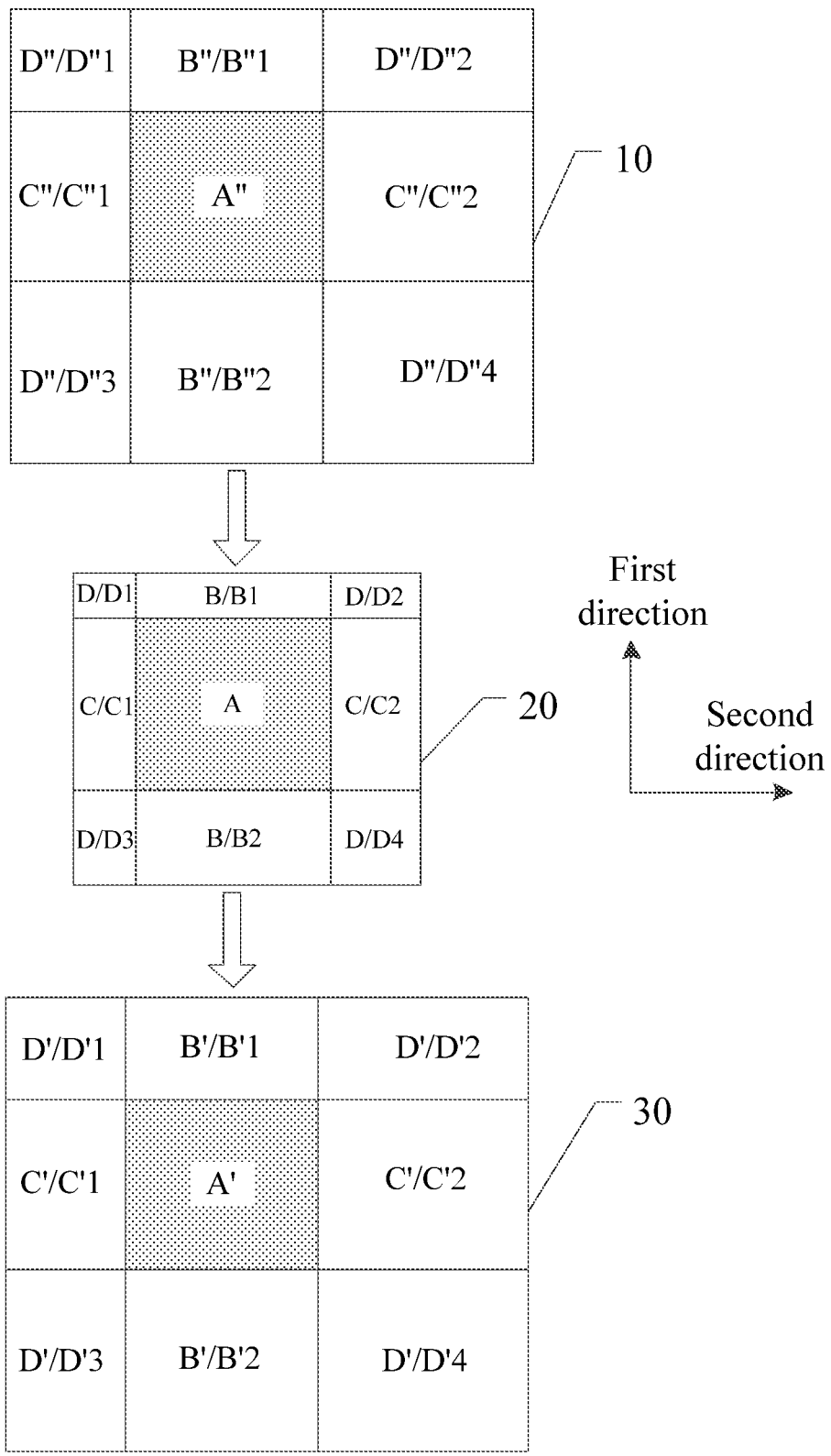
FIG. 4 is a schematic diagram of conversion among an original image, a first image and a second image according to an embodiment of the present disclosure.

FIG. 1 is a schematic flow chart of an image display method according to an embodiment of the present disclosure; FIGS. 2A and 2B are schematic diagrams of a first region and a second region in first images according to an embodiment of the present disclosure; FIG. 3 is a schematic diagram of a first region and a second region in a first image according to another embodiment of the present disclosure; FIG. 4 is a schematic diagram of conversion among an original image, a first image and a second image according to an embodiment of the present disclosure.

For example, as shown in FIG. 1, the image display method according to the embodiment of the present disclosure includes following steps:

S51: acquiring a first image;

S52: determining a first region and a second region in the first image;

S53: performing a first rendering algorithm on the first region in the first image and performing a second rendering algorithm on the second region in the first image, so as to obtain a second image, where a rendering resolution of the first rendering algorithm is greater than a rendering resolution of the second rendering algorithm;

S54: displaying the second image.

The image display method according to the embodiments of the present disclosure may be conducted at a display device end, and achieves the fixation point rendering effects by performing different rendering algorithms on different display regions at the display device, thereby reducing the data transmission amount of the host (for example, a central processing unit (CPU) of a computer), and increasing a refresh frequency of a display screen.

For example, at the display device, different rendering algorithms may be performed on different display regions by using a driving chip.

For example, the rendering resolution of the first rendering algorithm may be a full rendering resolution. Therefore, the first region may be displayed in high-definition. For example, in the first region, each sub-pixel may be rendered with one data signal. The rendering resolution of the second rendering algorithm is less than the rendering resolution of the first rendering algorithm. For example, in the second region, every two identical sub-pixels may be rendered with the same one data signal. But the present disclosure is not limited thereto, in the second region, every plural identical sub-pixels may be rendered with the same one data signal.

For example, as shown in FIG. 2A, the first image 20 may include a first region 21 and a second region 22. The first image 20 may have a rectangular shape (or other shapes), and the first region 21 may be located at any one corner of the rectangle. In this case, as shown in FIG. 2B, the first image 20 may be divided into four sub-regions. The second region 22 may include a first sub-region B, a second sub-region C and a third sub-region D. The first region 21 may be a fourth sub-region A.

For example, the first sub-region B of the first image 20 is adjacent to the first region 21 (that is, the fourth sub-region A) of the first image 20 in a first direction. The second sub-region C of the first image 20 is adjacent to the first region 21 of the first image 20 in a second direction. The third sub-region D of the first image 20 is not adjacent to the first region 21 of the first image 20. For example, the first direction is perpendicular to the second direction.

It should be noted that in the present disclosure, "adjacent" may mean that the sub-region of the second region 22 (for example, the first sub-region B and the second sub-region C in FIG. 2B) is adjacent to at least one side of the first region 21. "Not adjacent" means that the sub-region in the second region 22 (for example, the third sub-region D in FIG. 2B) is not adjacent to any one side of the first region 21.

For example, the first sub-region B, the second sub-region C and the third sub-region D of the first image 20 may further be divided. For example, in the second direction, the first sub-region B of the first image 20 may further be divided into a plurality of parts which may have the same shape or different shapes. In the first direction, the second sub-region C of the first image 20 may further be divided into a plurality of parts. In the first direction or the second direction, the third sub-region D of the first image 20 may also further be divided into a plurality of parts. In the embodiments of the present disclosure, the division, number and arrangement of each sub-region in the second region 22 are not specifically limited.

For example, the first region 21 of the first image 20 may also be located at any side of the first image 20; or the first region 21 of the first image 20 may also be located in the middle of the first image 20, that is, the first region 21 of the first image 20 is not in contact with sides and corners of the first image 20. In the embodiments of the present disclosure, the specific position of the first region 21 is not limited.

For example, the first image 20 may be divided into four sub-regions. The first region 21 includes one sub-region, and the second region 22 includes three sub-regions.

For example, the first region 21 may be located at any side of the first image 20. In this case, the first region 21 includes one sub-region, and the second region 22 includes three sub-regions. For example, the three sub-regions are the first sub-region B, the second sub-region C and the third sub-region D respectively. The first sub-region B includes two parts, the third sub-region D includes two parts and the second sub-region C only includes one part. Therefore, the first image 20 is divided into six parts.

For example, as shown in FIG. 3, the first region 21 may be located in the middle of the first image 20. In this case, the first region 21 is the fourth sub-region A, the second region 22 may include the first sub-region B, the second sub-region C and the third sub-region D, and the first sub-region B includes a first part B1 and a second part B2; the second sub-region C includes a third part C1 and a fourth part C2; the third sub-region D includes a fifth part D1, a sixth part D2, a seventh part D3 and an eighth part D4. Therefore, the first image 20 is divided into nine parts. It should be noted that each part may further be divided.

It should be noted that, in the following description of the present disclosure, the embodiments of the present disclosure is described by taking a case that the first image is divided into nine parts (that is the example shown in FIG. 3) as an example. However, persons skilled in the art should know that the image display method according to the embodiments of the present disclosure may also be applied to the first image which is divided in other manners.

For example, before performing the step SM, the image display method may further include following steps:

S41: generating an original image;

S42: determining a first region and a second region in the original image;

S43: performing high-definition rendering processing on the first region in the original image, and performing compression rendering processing on the second region in the original image, so as to generate the first image that is compressed;

S44: outputting the first image that is compressed.

For example, as shown in FIG. 4, the original image 10 may be generated by data signals of an image that needs to be displayed. The process of generating the compressed first image 20 based on the original image 10 may be completed in an image processing device. Then, the image processing device transmits the compressed first image 20 to the display device. Thus, the data amount transmitted to the display device by the image processing device is only the data signal amount of the compressed first image 20, thereby reducing the data transmission amount and reducing the power consumption of the image processing device.

It should be noted that in practical applications, the first image 20 may not be displayed. That is, in the image processing device, the data signal of each pixel in the compressed first image 20 may be obtained according to the original image 10, and then the data signals of the first image 20 is transmitted to the display device for subsequent processing.

For example, the image processing device may be a CPU of a computer, a Graphic Processing Unit (GPU), or the like.

For example, in the step S42, the first region and the second region in the original image 10 may be preset, and are fixed during the process of displaying an image. For another example, the first region and the second region in the original image 10 may also change with a gazing direction of human eyes. In this case, the step S42 may include: detecting a line of sight of human eyes; and determining the first region in the original image 10 according to the line of sight of the human eyes. For example, the region other than the first region in the original image 10 is the second region of the original image 10. For example, the first region is the fixation region of human eyes, and the second region is the non-fixation region.

For example, as shown in FIG. 4, the original image 10 may be divided into nine parts. For example, a first region of the original image 10 may be a fourth sub-region A", and a second region of the original image 10 may include a first sub-region B", a second sub-region C" and a third sub-region D", and the first sub-region B", the second sub-region C" and the third sub-region D" are in one-to-one correspondence to the first sub-region B, the second sub-region C and the third sub-region D in the first image 20. The first sub-region B" in the original image 10 is adjacent to the first region (that is, the fourth sub-region A") in the original image 10 in the first direction, the second sub-region C" in the original image 10 is adjacent to the first region in the original image 10 in the second direction, and the third sub-region D" in the original image 10 is not adjacent to the first region in the original image 10. The first sub-region B" includes a first part B"1 and a second part B"2; the second sub-region C" includes a third part C1" and a fourth part C"2; the third sub-region D" includes a fifth part D"1, a sixth part D"2, a seventh part D"3 and an eighth part D"4.

For example, the nine parts in the first image 20 may be in one-to-one correspondence to the nine parts in the original image 10.

For example, the original image 10 shown in FIG. 4 is taken as an example. In the step S43, performing the compression rendering processing on the second region in the original image 10 may comprise following steps:

S431: in a first direction, compressing the first sub-region B" in the original image 10 according to a ratio of 1/F1;

S432: in a second direction, compressing the second sub-region C" in the original image 10 according to a ratio of 1/F2;

S433: in the first direction, compressing the third sub-region D" in the original image 10 according to the ratio of 1/F1, and in the second direction, compressing the third sub-region D" in the original image 10 according to the ratio of 1/F2.

For example, the compression processing may implemented by using an interpolation algorithm. The interpolation algorithm, for example, may comprise Lagrangian interpolation, Newton interpolation, Hermite interpolation, or the like.

For example, F1 and F2 are both greater than 1. According to actual needs, F1 and F2 may be the same or different, which is not limited herein. For another example, F1 and F2 may be preset, and remain unchanged during the process of displaying an image; or, F1 and F2 may also vary according to a size of the second region in the original image 10. For example, in the case where the data transmission amounts are the same and the original images have the fixed size, with respect to a first original image and a second original image, a size of the first original image is the same as that of the second original image (for example, 720×1080), but a fixation region of the first original image is different from that of the second original image. That is, a size of a first region in the first original image is different from a size of a first region in the second original image. For example, if the size of the first region in the first original image is less than the size of the first region in the second original image, i.e., a size of a second region in the first original image is larger than a size of a second region in the second original image, in the above-mentioned steps S431 to S433, the ratios of 1/F1 and 1/F2 for compressing the second region in the first original image may be larger than the ratios of 1/F1' and 1/F2' for compressing the second region in the second original image respectively, so that the data transmission amount of the first original image and the data transmission amount of the second original image are the same.

For example, the step S433 may be an independent step, but the present disclosure is not limited thereto. The processing on the third sub-region D" in the step S433 may also be implemented in the steps S431 and S432. That is, in the step S431, the first sub-region B" and the third sub-region D" in the original image 10 may be compressed, in the first direction, according to the ratio of 1/F1 simultaneously; in the step S432, the second sub-region C" and the third sub-region D" in the original image 10 may be compressed, in the second direction, according to the ratio of 1/F2 simultaneously.

For example, as shown in FIG. 4, the first rendering algorithm is performed on the first region 21 (that is, the fourth sub-region A) in the first image 20, and the second rendering algorithm is performed on the second region 22 (that is, respective parts of B1, B2, C1, C2, D1, D2, D3 and D4) in the first image 20, so as to obtain the second image 30. The second image 30, for example, may also include nine parts which are in one-to-one correspondence to the nine parts in the first image 20. For example, the fourth sub-region A in the first image 20 can be processed according to the first rendering algorithm, to obtain the fourth sub-region A' in the second image 30. The first sub-region B, the second sub-region C and the third sub-region D in the first image 20 can be processed according to the second rendering algorithm, to obtain the first sub-region B', the second sub-region C' and the third sub-region D' in the second image 30 respectively. For example, the first part B1, the second part B2, the third part C1, the fourth part C2, the fifth part D1, the sixth part D2, the seventh part D3 and the eighth part D4 in the first image 20 correspond to the first part B'1, the second part B'2, the third part C'1, the fourth part C'2, the fifth part D'1, the sixth part D'2, the seventh part D'3 and the eighth part D'4 in the second image 30 respectively.

For example, in the original image 10, two parts (that is, the first part B"1 and the second part B"2) in the first sub-region B" may be compressed according to different ratios, or may also be compressed according to the same ratio. For example, in the first direction, the first part B"1 is compressed according to the ratio of 1/T1, the second part B"2 is compressed according to the ratio of 1/T2, T1 and T2 both are greater than 1. Similarly, the two parts in the second sub-region C" may be compressed according to different ratios, or may also be compressed according to the same ratio; and the four parts in the third sub-region D" may be compressed according to different ratios, or may also be compressed according to the same ratio.

It should be noted that in the first direction, the compression ratios of the first part B"1, the fifth part D"1 and the sixth part D"2 in the original image 10 may be the same; the compression ratios of the second part B"2, the seventh part D"3 and the eighth part D"4 in the original image 10 may be the same. In the second direction, the compression ratios of the third part C"1, the fifth part D"1 and the seventh part D"3 in the original image 10 may be the same; and the compression ratios of the fourth part C"2, the sixth part D"2 and the eighth part D"4 in the original image 10 may be the same.

For example, the fourth sub-region A" in the original image 10, the fourth sub-region A in the first image 20, and the fourth sub-region A' in the second image 30 have the same shape. The size (for example, in pixels) of each part in the second region in the first image 20 is less than the size (for example, in pixels) of each corresponding part in the second region in the second image 30. For example, a physical size of each part in the second region in the original image 10 may be the same as a physical size of each corresponding part in the second region in the second image 30.

For example, the first image 20 may be a 2K*2K compressed image, and the second image 30 may be a 2K*4K display image. Thus, this image display method can achieve fixation point rendering effects, reduce the data transmission amount and increase the refresh rate by only inputting the 2K*2K data signal, and displaying an image on a 2K*4K BV3 display module through adopting rendering algorithms based on regions. It should be noted that the above-mentioned 2K*2K and 2K*4K represent the number of pixels.

It should be noted that the first rendering algorithm and the second rendering algorithm represent the processing on the data signal of the sub-pixel in each region of the first image 20.

For example, the first region and the second region in the first image 20 correspond to the first region and the second region of the original image 10 respectively. Thus, the first region 21 and the second region 22 in the first image 20 may also be preset, and remain unchanged during the process of displaying an image. Or, the first region 21 and the second region 22 in the first image 20 may also vary with the gazing direction of human eyes. In this case, the first region 21 may be, for example, the fixation region, and the second region 22 may be the non-fixation region. Therefore, this image display method can implement the fixation point display.

For example, the first image 20 may have a resolution of 2K, and the second image 30 have a resolution of 4K. For example, the resolution of the second region in the first image 20 is less than that of the second region in the second image 30. It should be noted that the above-mentioned "resolution" for example, represents a visual resolution.

For example, sub-pixels in the first image 20 may be arranged according to a standard RGB array arrangement manner; but sub-pixels in the second image 30 are arranged according to a Bright View 3 (BV3) array arrangement manner. The BV3 array arrangement manner is a delta array arrangement manner, and may increase the visual resolution and improve the image quality.

Figure 5A:
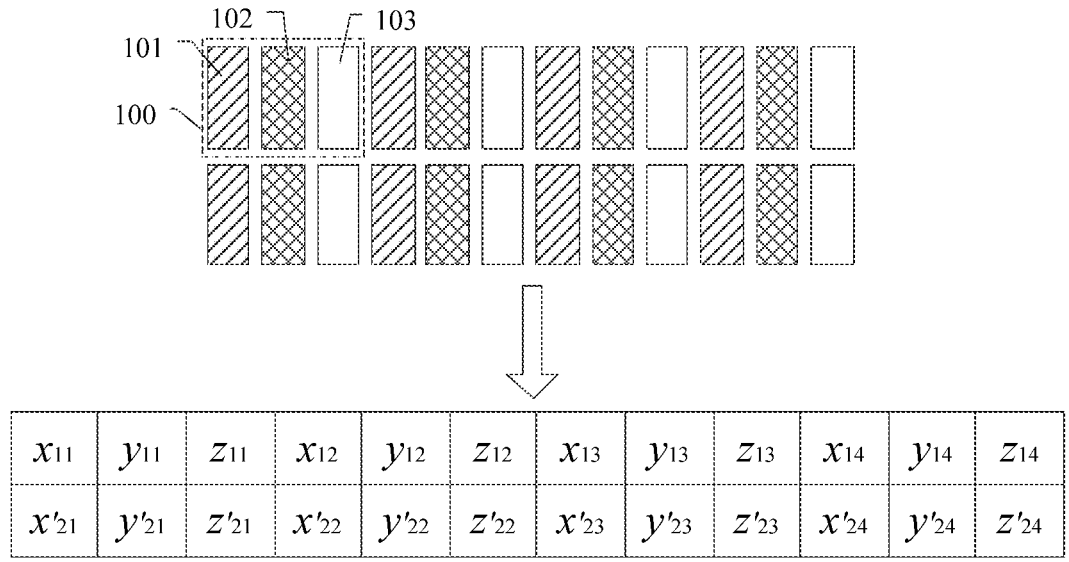
FIG. 5A is a local schematic diagram of a first region in a first image according to an embodiment of the present disclosure.
Figure 5B:
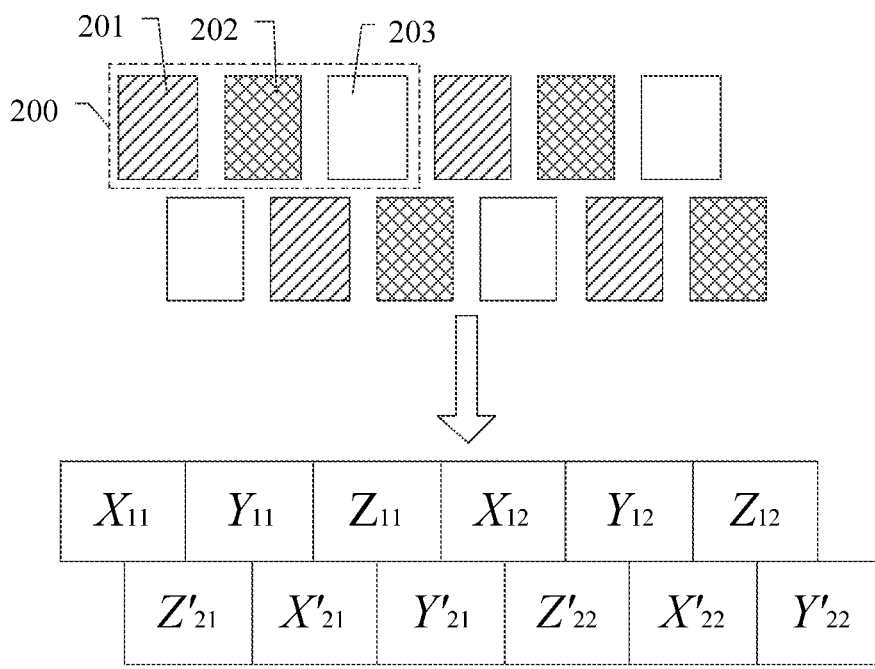
FIG. 5B is a local schematic diagram of a first region in a second image according to an embodiment of the present disclosure.

FIG. 5A is a local schematic diagram of a first region in a first image according to an embodiment of the present disclosure; and FIG. 5B is a local schematic diagram of a first region in a second image according to an embodiment of the present disclosure.

For example, in the step S53, performing the first rendering algorithm on the first region 21 in the first image includes: performing pixel conversion on pixels of odd-numbered rows in the first region 21 in the first image by using a first conversion formula; and performing the pixel conversion on pixels of even-numbered rows in the first region 21 in the first image by using a second conversion formula.

For example, during the rendering processing, the physical size of the first region 21 of the first image 20 is unchanged. That is, the shapes and physical sizes of the first region 21 of the first image 20 and the first region of the second image 30 may be the same.

For example, in the first region of the second image 30, all the pixels are arranged according to the BV3 array arrangement manner.

For example, the first region in the second image shown in FIG. 5B corresponds to the first region in the first image shown in FIG. 5A. That is, the first region in the first image shown in FIG. 5A is subjected to rendering conversion according to the first conversion formulae and the second conversion formulae, so as to obtain the first region in the second image shown in FIG. 5B.

For example, as shown in FIG. 5A, the first region 21 in the first image 20 includes a plurality of pixels 100, and each pixel 100 at least includes a first sub-pixel 101, a second sub-pixel 102 and a third sub-pixel 103. For example, the first sub-pixel 101, the second sub-pixel 102 and the third sub-pixel 103 in the first region 21 of the first image 20 may be a red sub-pixel, a green sub-pixel and a blue sub-pixel respectively. For another example, each pixel 100 may further include a fourth sub-pixel, and the fourth sub-pixel may be a white sub-pixel.

It should be noted that the first sub-pixel 101, the second sub-pixel 102 and the third sub-pixel 103, for example, may also be a yellow sub-pixel, a magenta sub-pixel and a cyan sub-pixel respectively. The present disclosure is not limited thereto.

For example, as shown in FIG. 5B, the first region in the second image 30 may include a plurality of pixels 200, each pixel 200 may also at least include a first sub-pixel 201, a second sub-pixel 202 and a third sub-pixel 203. Correspondingly, the first sub-pixel 201, the second sub-pixel 202 and the third sub-pixel 203 in the first region of the second image 30 may correspond to the first sub-pixel 101, the second sub-pixel 102 and the third sub-pixel 103 in the first region of the first image 20 respectively. For example, the first sub-pixel 201, the second sub-pixel 202 and the third sub-pixel 203 in the first region of the second image 30 may also be a red sub-pixel, a green sub-pixel and a blue sub-pixel respectively.

For example, the first conversion formula may be expressed as:

$$X_{j_1\left(\frac{i_1+1}{2}\right)} = \alpha_{j_11} x_{j_1 i_1} + \alpha_{j_12} x_{j_1(i_1+1)},$$

$$Y_{j_1\left(\frac{i_1+1}{2}\right)} = \beta_{j_11} y_{j_1 i_1} + \beta_{j_12} y_{j_1(i_1+1)},$$

$$Z_{j_1\left(\frac{i_1+1}{2}\right)} = \gamma_{j_11} z_{j_1 i_1} + \gamma_{j_12} z_{j_1(i_1+1)},$$

where $i_1$ and $j_1$ are both integers, and $i_1=1,3,5,\ldots,n_1-1$ is used to represent the column number of odd-numbered rows (for example, the column number of odd-numbered rows in the first region of the first image), $j_1=1,3,5,\ldots,m_1-1$ is used to represent the row number of odd-numbered rows (for example, the row number of odd-numbered rows in the first region of the first image), $n_1$ and $m_1$ are both positive integers, and $$X_{j_1\left(\frac{i_1+1}{2}\right)}, Y_{j_1\left(\frac{i_1+1}{2}\right)} \text{ and } Z_{j_1\left(\frac{i_1+1}{2}\right)}$$

respectively represent the data signals of the first sub-pixel 201, the second sub-pixel 202 and the third sub-pixel 203 of the $j_1$-th row and the $$\frac{i_1+1}{2}\text{-th}$$

column in the first region of the second image 30. $x_{j_1 i_1}$, $y_{j_1 i_1}$ and $z_{j_1 i_1}$ respectively represent the data signals of the first sub-pixel 101, the second sub-pixel 102 and the third sub-pixel 103 of the $j_1$-th row and the $i_1$-th column in the first region of the first image 20. $x_{j_1(i_1+1)}$, $y_{j_1(i_1+1)}$ and $z_{j_1(i_1+1)}$ respectively represent the data signals of the first sub-pixel 101, the second sub-pixel 102 and the third sub-pixel 103 of the $j_1$-th row and the $(i_1+1)$-th column in the first region of the first image 20. $\alpha_{j_11}$ and $\alpha_{j_12}$ represent conversion coefficients of the first sub-pixels 101 of the $j_1$-th row in the first region of the first image, $\beta_{j_11}$ and $\beta_{j_12}$ represent conversion coefficients of the second sub-pixels 102 of the $j_1$-th row in the first region of the first image, $\gamma_{j_11}$ and $\gamma_{j_12}$ represent conversion coefficients of the third sub-pixels 103 of the $j_1$-th row in the first region of the first image, and $\alpha_{j_11}+\alpha_{j_12}=1$, $\beta_{j_11}+\beta_{j_12}=1$, $\gamma_{j_11}+\gamma_{j_12}=1$.

For example, the second conversion formula may be expressed as:

$$X'_{j_2\left(\frac{i_2+1}{2}\right)} = \alpha_{j_23} x'_{j_2(i_2+1)} + \alpha_{j_24} x'_{j_2(i_2+2)}, X'_{j_2\frac{n_2}{2}} = x'_{j_2 n_2},$$

$$i_2 = 1, 3, 5, \ldots, n_2-3, j_2 = 2, 4, 6, \ldots, m_1,$$

$$Y'_{j_2\left(\frac{i_2+1}{2}\right)} = \beta_{j_23} y'_{j_2(i_2+1)} + \beta_{j_24} y'_{j_2(i_2+2)}, Y'_{j_2\frac{n_2}{2}} = y'_{j_2 n_2},$$

$$i_2 = 1, 3, 5, \ldots, n_2-3, j_2 = 2, 4, 6, \ldots, m_1,$$

$$Z'_{j_2\left(\frac{i_2+1}{2}\right)} = \gamma_{j_24} z'_{j_2(i_2+1)} + \gamma_{j_23} z'_{j_2(i_2+2)}, Z'_{j_2 1} = z'_{j_2 1},$$

$$i_2 = 3, 5, \ldots, n_2-1, j_2 = 2, 4, 6, \ldots, m_1,$$

where $i_2$, $j_2$ and $n_2$ are all positive integers, and $i_2$ is used to represent the column number of the even-numbered rows (for example, the column number of the even-numbered rows in the first region of the first image), $j_2$ is used to represent the row number of even-numbered rows (for example, the row number of even-numbered rows in the first region of the first image), $n_2$ represents the total number of columns of the pixels of the $j_2$-th row;

$$X'_{j_2\left(\frac{i_2+1}{2}\right)}, Y'_{j_2\left(\frac{i_2+1}{2}\right)} \text{ and } Z'_{j_2\left(\frac{i_2+1}{2}\right)}$$

respectively represent the data signals of the first sub-pixel 201, the second sub-pixel 202 and the third sub-pixel 203 of the $j_2$-th row and the $$\frac{i_2+1}{2}\text{-th}$$

column in the first region of the second image 30, $$X'_{j_2\frac{n_2}{2}} \text{ and } Y'_{j_2\frac{n_2}{2}}$$

respectively represent the data signals of the first sub-pixel 201 and the second sub-pixel 202 of the $j_2$-th row and the $$\frac{n_2}{2}\text{-th}$$

column in the first region of the second image 30, $Z'_{j_2 1}$ represents the data signal of the third sub-pixel 203 of the $j_2$-th row and the first column in the first region of the second image 30. $x'_{j_2(i_2+1)}$, $x'_{j_2(i_2+2)}$ and $x'_{j_2 n_2}$ respectively represent the data signals of the first sub-pixels 101 of the $j_2$-th row and the $(i_2+1)$-th column, the $j_2$-th row and the $(i_2+2)$-th column, and the $j_2$-th row and the $n_2$-th column in the first region of the first image 20. $y'_{j_2(i_2+1)}$, $y'_{j_2(i_2+2)}$ and $y'_{j_2 n_2}$ respectively represent the data signals of the second sub-pixels 102 of the $j_2$-th row and the $(i_2+1)$-th column, the $j_2$-th row and the $(i_2+2)$-th column, and the $j_2$-th row and the $n_2$-th column in the first region of the first image 20. $z'_{j_2(i_2-1)}$, $z'_{j_2 i_2}$ and $z'_{j_2 1}$ respectively represent the data signals of the third sub-pixels 103 of the $j_2$-th row and the $(i_2-1)$-th column, the $j_2$-th row and the $i_2$-th column, and the $j_2$-th row and the first column in the first region of the first image 20. $\alpha_{j_2 3}$ and $\alpha_{j_2 4}$ represent conversion coefficients of the first sub-pixels 101 of the $j_2$-th row in the first region of the first image, $\beta_{j_2 3}$ and $\beta_{j_2 4}$ represent conversion coefficients of the second sub-pixels 102 of the $j_2$-th row in the first region of the first image, $\gamma_{j_2 3}$ and $\gamma_{j_2 4}$ represent conversion coefficients of the third sub-pixels 103 of the $j_2$-th row in the first region of the first image, and $\alpha_{j_2 3}+\alpha_{j_2 4}=1$, $\beta_{j_2 3}+\beta_{j_2 4}=1$, $\gamma_{j_2 3}+\gamma_{j_2 4}=1$.

For example, in the first image 20, the conversion coefficients $\alpha_{j_1 1}$ and $\alpha_{j_1 2}$ of the first sub-pixels 101 of respective odd-numbered rows may be different or the same; the conversion coefficients $\beta_{j_1 1}$ and $\beta_{j_1 2}$ of the second sub-pixels 102 of respective odd-numbered rows may be different or the same; the conversion coefficients $\gamma_{j_1 1}$ and $\gamma_{j_1 2}$ of the third sub-pixels 103 of respective odd-numbered rows may be different or the same. Similarly, in the first image 20, for the conversion coefficients of each sub-pixel of respective even-numbered rows, $\alpha_{j_2 3}$ and $\alpha_{j_2 4}$ may be different or the same; $\beta_{j_2 3}$ and $\beta_{j_2 4}$ may be different or the same; $\gamma_{j_2 3}$ and $\gamma_{j_2 4}$ may be different or the same.

For example, the conversion coefficients of $\alpha_{j_1 1}$, $\alpha_{j_1 2}$, $\alpha_{j_2 3}$, $\alpha_{j_2 4}$, $\beta_{j_1 1}$, $\beta_{j_1 2}$, $\beta_{j_2 3}$, $\beta_{j_2 4}$, $\gamma_{j_1 1}$, $\gamma_{j_1 2}$, $\gamma_{j_2 3}$ and $\gamma_{j_2 4}$ may have an initial value of 0.5. The conversion coefficients of $\alpha_{j_1 1}$, $\alpha_{j_1 2}$, $\alpha_{j_2 3}$, $\alpha_{j_2 3}$, $\alpha_{j_2 4}$, $\beta_{j_1 1}$, $\beta_{j_1 2}$, $\beta_{j_2 3}$, $\beta_{j_2 4}$, $\gamma_{j_1 1}$, $\gamma_{j_1 2}$, $\gamma_{j_2 3}$ and $\gamma_{j_2 4}$ may be preset according to empirical values. The conversion coefficients $\alpha_{j_1 1}$ and $\alpha_{j_1 2}$ respectively represent a weight of the data signal $x_{j_1 i_1}$ of the first sub-pixel 101 of the $j_1$-th row and the $i_1$-th column and a weight of the data signal $x_{j_1(i_1+1)}$ of the first sub-pixel 101 of the $j_1$-th row and the $(i_1+1)$-th column in the first region of the first image 20. For example, in the above-mentioned formula, the conversion coefficients $\alpha_{j_1 1}$ and $\alpha_{j_1 2}$ may be determined according to areas and a relative positional relationship of the first sub-pixel 101 of the $j_1$-th row and the i-th column and the first sub-pixel 101 of the $j_1$-th row and the $(i_1+1)$-th column in the first region of the first image 20 respectively. Similarly, $\alpha_{j_2 3}$, $\alpha_{j_2 4}$, $\beta_{j_1 1}$, $\beta_{j_1 2}$, $\beta_{j_2 3}$, $\beta_{j_2 4}$, $\gamma_{j_1 1}$, $\gamma_{j_1 2}$, $\gamma_{j_2 3}$ and $\gamma_{j_2 4}$ are weights of respective sub-pixels respectively.

For example, in the first image 20, $m_1$ represents the total number of rows of the pixels of the first region, $n_1$ represents the total number of columns of the pixels in the $j_1$-th row in the first region, and $n_2$ represents the total number of columns of the pixels in the $j_2$-th row in the first region. For example, $n_1$ and $n_2$ may be equal, so that the first region comprises an $m_1 * n_1$ (or $n_2$) pixel array.

For example, $m_1$, $n_1$ and $n_2$ are all positive integers, and $n_1$ and $n_2$ are both even numbers.

For example, the data signal may represent a grayscale luminance, i.e., a luminous intensity.

For example, the shape of the first region may be a rectangle, and may also be a circle, a trapezoid, a polygon, or the like. For example, image filtering may be performed on an edge of the first region, such that the shape of the first region is a circle, a trapezoid, a polygon, or the like. For example, the image filtering can adopt a filtering function such as smoothing filtering and Gaussian filtering.

For example, as shown in FIGS. 5A and 5B, in a local schematic diagram, in the first region of the first image 20, each row includes four pixels 100; in the first region of the second image 30, each row includes two pixels 200. That is, the four pixels 100 in each row of the first image 20 may be converted into two pixels 200 in each row of the second image 30.

For example, in a row direction, a pixel width of each sub-pixel in the first region of the second image 30 is greater than a pixel width of each corresponding sub-pixel in the first region of the first image 20; in a column direction, a pixel length of each sub-pixel in the first region of the second image 30 is equal to a pixel length of each corresponding sub-pixel in the first region of the first image 20. For example, in one example, the pixel width of each sub-pixel in the first region of the second image 30 is twice the pixel width of each sub-pixel in the first region of the first image 20.

For example, as shown in FIG. 5A and FIG. 5B, in a specific example, the conversion relationship between each pixel 100 in the first region of the first image 20 and each pixel 200 in the first region of the second image 30 may be expressed as follows:

For pixels of a first row in the first region of the second image 30 (pixels in odd-numbered rows, using the first conversion formula):

$$X_{11}=\alpha_{11}x_{11}+\alpha_{12}x_{12}, Y_{11}=\beta_{11}y_{11}+\beta_{12}y_{12}, Z_{11}=\gamma_{11}z_{11}+\gamma_{12}z_{12}$$

$$X_{12}=\alpha_{11}x_{13}\alpha_{12}x_{14}, Y_{12}=\beta_{11}y_{13}+\beta_{11}y_{13}+\beta_{12}y_{14}, Z_{12}=\gamma_{11}z_{13}+\gamma_{12}z_{14}$$

For pixels in a second row in the first region of the second image 30 (pixels in even-numbered rows, using the second conversion formula):

$$X'_{21}=\alpha_{23}x'_{22}+\alpha_{24}x'_{23}, Y'_{21}=\beta_{23}y'_{22}+\beta_{24}y'_{23}, Z'_{21}=z'_{21}$$

$$X'_{22}=x'_{24}, Y'_{22}=y'_{24}, Z'_{22}=\gamma_{24}z'_{22}+\gamma_{23}z'_{23}$$

To sum up, the first region of the first image 20 having the RBG array arrangement mode is converted into the first region of the second image 30 having the BV3 array arrangement mode.

Figure 6A:
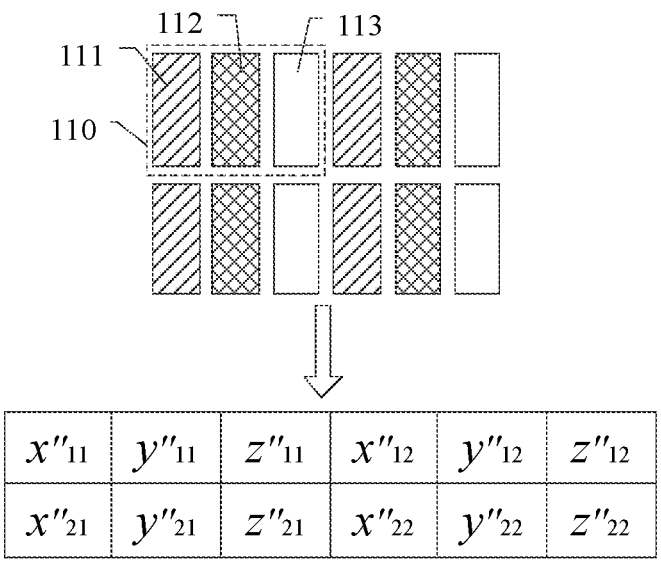
FIG. 6A is a local schematic diagram of a second region in a first image according to an embodiment of the present disclosure.
Figure 6B:
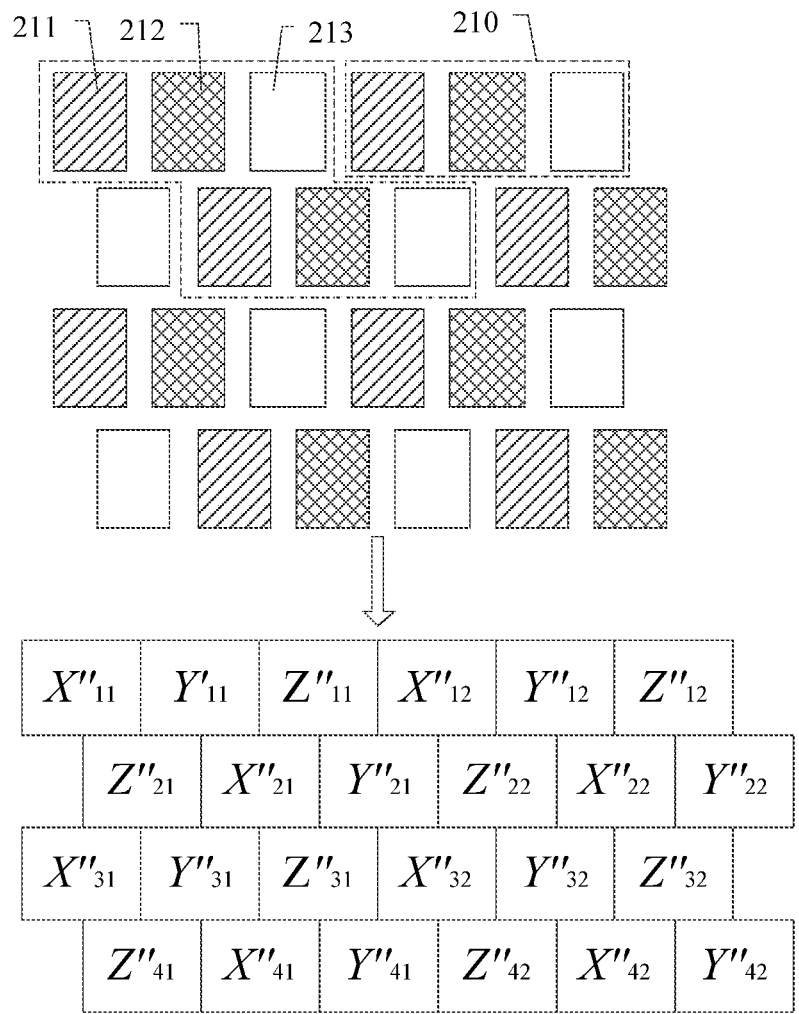
FIG. 6B is a local schematic diagram of a second region in a second image according to an embodiment of the present disclosure.

FIG. 6A is a local schematic diagram of a second region in a first image according to an embodiment of the present disclosure; FIG. 6B is a local schematic diagram of a second region in a second image according to an embodiment of the present disclosure.

For example, the first image 20 shown in FIG. 4 is taken as an example. In the step S53, performing the second rendering algorithm on the second region may include following steps:

S5301: in the first direction, expanding the first sub-region B in the first image 20 according to a ratio of F1/2, and in the second direction, compressing the first sub-region B in the first image 20 according to a ratio of 1/2;

S5302: in the second direction, expanding the second sub-region C in the first image 20 according to a ratio of F2/2, and in the first direction, compressing the second sub-region C in the first image 20 according to a ratio of 1/2;

S5303: in the first direction, expanding the third sub-region D in the first image 20 according to the ratio of F1/2, and in the second direction, expanding the third sub-region D in the first image 20 according to a ratio of F2/2.

For example, the expansion processing may also use an interpolation algorithm.

For example, the expansion processing in the step S53 corresponds to the compression processing in the step S43. That is, the direction of the expansion processing in the step S53 corresponds to the direction of the compression processing in the step S43. For example, in the step S43, the first sub-region B" in the original image 10 is compressed, in the first direction, according to a ratio of 1/F1, then in the step S53, the first sub-region B in the first image 20 is expanded, in the first direction, according to a ratio of F1/2.

For example, in the step S53, after the expansion processing and the compression processing are performed on the second region in the first image 20, performing a second rendering algorithm on the second region in the first image 20 further includes performing pixel conversion on pixels of the second region in the first image by using a third conversion formula.

For example, as shown in FIG. 6A, the second region 21 in the first image 20 includes a plurality of pixels 110, and each pixel 110 at least includes a first sub-pixel 111, a second sub-pixel 112 and a third sub-pixel 113. For example, as shown in FIG. 6B, the second region in the second image 30 may include a plurality of pixels 210, and each pixel 210 may also at least include a first sub-pixel 211, a second sub-pixel 212 and a third sub-pixel 213. For example, the first sub-pixel 111, the second sub-pixel 112 and the third sub-pixel 113 in the second region 21 of the first image 20 may be a red sub-pixel, a green sub-pixel and a blue sub-pixel respectively. Correspondingly, the first sub-pixel 211, the second sub-pixel 212 and the third sub-pixel 213 in the second region of the second image 30 may also be a red sub-pixel, a green sub-pixel and a blue sub-pixel respectively.

For example, after the data signals of all pixels in the second region of the first image 20 are converted by using the third conversion formula, the pixels may be arranged in a corresponding region of the display device in a Smart View arrangement manner for displaying.

For example, the third conversion formula may be expressed as:

$$X''_{(2k-1)l} = X''_{(2k)l} = x''_{kl},$$

$$Y''_{(2k-1)l} = Y''_{(2k)l} = y''_{kl},$$

$$Z''_{(2k-1)l} = Z''_{(2k)(l+1)} = z''_{kl},$$

where k and l are both integers, and k=1,2,3, . . . , $m_2$ is used to represents the number of rows (for example, the number of rows of each sub-region of the second region in the first image), l=1,2,3, . . . , $n_3$ is used to represents the number of columns (for example, the number of columns of each sub-region of the second region in the first image), $X'_{(2k-1)l}$, $Y''_{(2k-1)l}$ and $Z'_{(2k-1)l}$ respectively represent the data signals of the first sub-pixel 211, the second sub-pixel 212 and the third sub-pixel 213 of the (2k−1)-th row and the l-th column in each sub-region of the second region in the second image 30. $X''_{(2k)l}$ and $Y''_{(2k)l}$ respectively represent the data signals of the first sub-pixel 211 and the second sub-pixel 212 of the (2k)-th row and the l-th column in each sub-region of the second region in the second image 30. $Z''_{(2k)(l+1)}$ represents the data signal of the third sub-pixel 213 of the (2k)-th row and the (l+1)-th column in each sub-region of the second region in the second image 30. $x''_{kl}$, $y''_{kl}$ and $z''_{kl}$ respectively represent data signals of the first sub-pixel 111, the second sub-pixel 112 and the third sub-pixel 113 of the k-th row and the l-th column in each sub-region of the second region in the first image.

For example, $m_2$ and $n_3$ are both positive integers. $n_3$ represents the total number of columns of the pixels in the k-th row, and $m_2$ represents the total number of rows of pixels in the first sub-region, the second sub-region or the third sub-region in the second region of the first image.

For example, in the first image 20, $m_2$ represents the total number of rows of pixels in a certain sub-region (or a certain part of a certain sub-region) in the second region. For example, when the pixel conversion is performed on the first part B1 in the first sub-region B, $m_2$ represents the total number of rows of pixels in the first part B1; when the pixel conversion is performed on the third part C1 in the second sub-region C, $m_2$ represents the total number of rows of pixels in the third part C1, and so on. $n_3$ represents the total number of columns of pixels in the k-th row of a certain sub-region (or a certain part of a certain sub-region) in the second region. For example, for each sub-region of the second region, $n_3$ may be the same or different; $m_2$ may be the same or different. As shown in FIG. 4, for the first part B1 and the second part B2 in the first sub-region B, the total numbers $n_3$ of columns of pixels may be the same, but the total numbers $m_2$ of rows of the pixels are different. For the third part C1 and the fourth part C2 in the second sub-region C, the total numbers $n_3$ of columns of pixels may be different, but the total numbers $m_2$ of rows of pixels are the same.

For example, as shown in FIGS. 6A and 6B, in a local schematic diagram, the second region of the first image 20 includes four pixels 110 in two rows and two columns. The second region of the second image 30 includes eight pixels 20 in four rows and two columns That is, the two pixels 110 in one row in the first image 20 may be converted into four pixels 210 in two rows in the second image 30. For example, in the row direction, the pixel width of each sub-pixel in the second region of the second image 30 is greater than the pixel width of each corresponding sub-pixel in the second region of the first image 20. In the column direction, the pixel length of each sub-pixel in the second region of the second image 30 is equal to the pixel length of each corresponding pixel in the second region of the first image 20. For example, in an example, the pixel width of each sub-pixel in the second region of the second image 30 is twice the pixel width of each sub-pixel in the second region of the first image 20.

For example, sub-pixels in the second region of the second image 30 are also arranged according to a BV3 array arrangement manner.

For example, as shown in FIGS. 6A and 6B, in a specific example, the conversion relationship between each pixel 110 in the second region of the first image 20 and each pixel 210 in the second region of the second image 30 may be expressed as follows:

For pixels of a first row and a second row in the second region of the second image 30:

$$X''_{11} = X''_{21} = x''_{11}, Y''_{11} = Y''_{21} = y''_{11}, Z''_{11} = Z''_{22} = z''_{11}$$

$$X''_{12} = X''_{22} = x''_{12}, Y''_{12} = Y''_{22} = y''_{12}, Z''_{12} = z''_{12}$$

For pixels of a third row and a fourth row in the second region of the second image 30:

$$X''_{31} = X''_{41} = x''_{21}, Y''_{31} = Y''_{41} = y''_{21}, Z''_{31} = Z''_{42} = z''_{21}$$

$$X''_{32} = X''_{42} = x''_{22}, Y''_{32} = Y''_{42} = y''_{32}, Z''_{32} = x''_{22}$$

For example, for a sub-pixel arranged in a first column of the even-numbered row in the second region of the second image 30, data signals $Z''_{21}$ and $Z''_{41}$ of the sub-pixel may be preset. For example, $Z''_{21}=0$, $Z''_{41}=0$.

To sum up, the second region of the first image 20 having the RBG array arrangement mode is converted into the second region of the second image 30 having the BV3 array arrangement mode.

For example, if the first sub-pixel 211, the second sub-pixel 212 and the third sub-pixel 213 represent a red sub-pixel R, a green sub-pixel G and a blue sub-pixel B respectively, then, in the second image 30, when sub-pixels of each odd-numbered row are arranged in an order of RGBRGB, sub-pixels of each even-numbered row are arranged in an order of BRGBRG. However, the present disclosure is not limited thereto. In the second image 30, for example, when the sub-pixels of each odd-numbered row are arranged in an order of GBRGBR, the sub-pixels of each even-numbered row are arranged in an order of RGBRGB.

For example, in the step S54, the pixels of the second image obtained after performing the first rendering algorithm and the second rendering algorithm on the first image are arranged on the display device according to the BV3 array arrangement mode, so as to display the second image.

Figure 7:
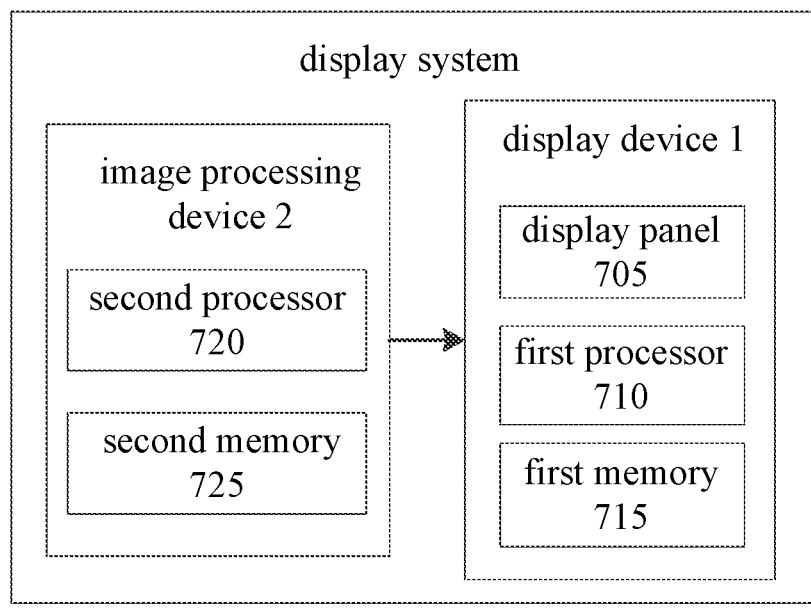
FIG. 7 is a schematic block diagram of a display system according to an embodiment of the present disclosure.

FIG. 7 is a schematic block diagram of a display system according to an embodiment of the present disclosure.

For example, as shown in FIG. 7, a display system provided by the embodiment of the present disclosure includes a display device 1 and an image processing device 2. The display device 1 includes a display panel 705, a first processor 710 and a first memory 715. The image processing device 2 includes a second processor 720 and a second memory 725. It should be noted that the components of the display system shown in FIG. 7 are merely illustrative, and not limitative. According to actual application requirement, the display system may further have other components.

For example, information transmission may be performed between the display device 1 and the image processing device 2 via a network.

For example, the network may include a wireless network, a wired network, and/or any combination of the wireless network and the wired network. The network may include a local area network, an internet, a telecommunication network, an Internet of Things based on the internet and/or telecommunication network, and/or any combinations of the above networks, or the like. For example, the wired network may communicate by means such as a twisted pair, coaxial cable or optical fiber transmission. The wireless network may communicate by means such as 3G/4G/5G mobile communication networks, Bluetooth, Zigbee or WiFi. The types and functions of the network are not limited in the present disclosure.

For example, the components in the display device 1 may be interconnected by a bus system and/or a connection mechanism (not shown) in other forms, so as to implement information transmission. The components in the image processing device 2 may also be interconnected by a bus system and/or a connection mechanism (not shown) in other forms, so as to implement information transmission.

For example, the first processor 710 may be disposed on a driving chip of the display device 1. The first processor 710 is a processing unit having the data processing ability and/or program execution ability. The first processor 710 may control other components in the display device 1 to perform desired functions.

For example, the second processor 720 may be a central processing unit (CPU) or other forms of processing unit having data processing capabilities and/or program execution capabilities, such as a graphics processing unit (GPU), a field-programmable gate array (FPGA), a tensor processing unit (TPU), or the like. The second processor 720 may control other components in the image processing device 2 to perform desired functions. For another example, the central processing unit (CPU) may be an X86, ARM architecture, or the like.

For example, the first memory 715 and the second memory 725 may comprise an arbitrary combination of one or more computer program products. The computer program products may comprise various forms of computer-readable storage media, such as volatile memory and/or non-volatile memory. The volatile memory may comprise, for example, a random access memory (RAM) and/or a cache or the like. The non-volatile memory may comprise, for example, a read only memory (ROM), a hard disk, an erasable programmable read only memory (EPROM), a portable compact disc-read only memory (CD-ROM), a USB memory, a flash memory, and the like. Various applications, various data such as the conversion coefficients, and various data used and/or generated by the applications, and the like, may also be stored in the computer-readable storage medium.

For example, one or more first computer instructions may be stored on the first memory 715. The first processor 710 may execute the first computer instruction, so as to implement various functions (for example, the first rendering algorithm and the second rendering algorithm). One or more second computer instructions may also be stored on the second memory 725. The second processor 720 may execute the second computer instructions, so as to implement various functions (for example, generating a compressed first image, or the like).

For example, the display panel 705 is configured to display a second image. The display panel may be a liquid crystal display (LCD) panel, an organic light-emitting diode display (OLED) panel, or the like.

For example, when the first computer instruction is executed by the first processor 710, following steps may be implemented: acquiring a compressed first image; determining a first region and a second region in the first image; performing a first rendering algorithm on the first region in the first image and performing a second rendering algorithm on the second region in the first image, so as to obtain a second image, where the rendering resolution of the first rendering algorithm is greater than the rendering resolution of the second rendering algorithm; and displaying the second image on the display panel.

For example, sub-pixels in the first image may be arranged according to a standard RGB array arrangement manner; sub-pixels in the second image are arranged according to a Bright View 3 (BV3) array arrangement manner.

For example, the resolution of the second region in the first image is less than that of the second region in the second image.

For example, in an example, when the first computer instruction is executed by the first processor 710, following steps may also be implemented: performing pixel conversion on pixels of odd-numbered rows in the first region in the first image by using a first conversion formula; and performing the pixel conversion on pixels of even-numbered rows in the first region in the first image by using a second conversion formula.

For example, the first region in the first image includes a plurality of pixels, and each of the pixels at least includes a first sub-pixel, a second sub-pixel and a third sub-pixel. It should be noted that, for a detail description of each pixel, reference may be made to the related description in the embodiments of the image display method, and the repetitions are not described herein again.

For example, the first conversion formula may be expressed as:

$$X_{j_1\left(\frac{i_1+1}{2}\right)} = \alpha_{j_11}x_{j_1i_1} + \alpha_{j_12}x_{j_1(i_1+1)},$$

$$Y_{j_1\left(\frac{i_1+1}{2}\right)} = \beta_{j_11}y_{j_1i_1} + \beta_{j_12}y_{j_1(i_1+1)},$$

$$Z_{j_1\left(\frac{i_1+1}{2}\right)} = \gamma_{j_11}z_{j_1i_1} + \gamma_{j_12}z_{j_1(i_1+1)},$$

where $i_1$, $j_1$, $n_1$ and $m_1$ are integers, and $i_1=1,3,5,\ldots,n_1-1$ is used to represent the column number of odd-numbered rows, $j_1=1,3,5,\ldots,m_1-1$ is used to represent the row number of odd-numbered rows, $n_1$ represents the total number of columns of pixels in the $j_1$-th row, $m_1$ represents the total number of rows of pixels in the first region of the first image, $$X_{j_1\left(\frac{i_1+1}{2}\right)}, Y_{j_1\left(\frac{i_1+1}{2}\right)} \text{ and } Z_{j_1\left(\frac{i_1+1}{2}\right)}$$

respectively represent the data signals of the first sub-pixel, the second sub-pixel and the third sub-pixel of the $j_1$-th row and the $$\frac{i_1+1}{2}\text{-th}$$

column in the first region of the second image 30. $x_{j_1 i_1}$, $y_{j_1 i_1}$ and $z_{j_1 i_1}$ respectively represent the data signals of the first sub-pixel, the second sub-pixel and the third sub-pixel of the $j_1$-th row and the $i_1$-th column in the first region of the first image. $x_{j_1(i_1+1)}$, $y_{j_1(i_1+1)}$ and $z_{j_1(i_1+1)}$ respectively represent the data signals of the first sub-pixel, the second sub-pixel and the third sub-pixel of the $j_1$-th row and the $(i_1+1)$-th column in the first region of the first image. $\alpha_{j_11}$ and $\alpha_{j_12}$ represent conversion coefficients of the first sub-pixels of the $j_1$-th row in the first region of the first image, $\beta_{j_11}$ and $\beta_{j_12}$ represent conversion coefficients of the second sub-pixels of the $j_1$-th row in the first region of the first image, $\gamma_{j_11}$ and $\beta_{j_12}$ represent conversion coefficients of the third sub-pixels of the $j_1$-th row in the first region of the first image, and $\alpha_{j_11}+\alpha_{j_12}=1$, $\beta_{j_11}+\beta_{j_12}=1$, $\gamma_{j_11}+\gamma_{j_12}=1$.

For example, the second conversion formula may be expressed as:

$$X'_{j_2\left(\frac{i_2+1}{2}\right)} = \alpha_{j_23}x'_{j_2(i_2+1)} + \alpha_{j_24}x'_{j_2(i_2+2)}, X'_{j_2\frac{n_2}{2}} = x'_{j_2 n_2},$$

$$i_2 = 1, 3, 5, \ldots, n_2-3, j_2 = 2, 4, 6, \ldots, m_1,$$

$$Y'_{j_2\left(\frac{i_2+1}{2}\right)} = \beta_{j_23}y'_{j_2(i_2+1)} + \beta_{j_24}y'_{j_2(i_2+2)}, Y'_{j_2\frac{n_2}{2}} = y'_{j_2 n_2},$$

$$i_2 = 1, 3, 5, \ldots, n_2-3, j_2 = 2, 4, 6, \ldots, m_1,$$

$$Z'_{j_2\left(\frac{i_2+1}{2}\right)} = \gamma_{j_24}z'_{j_2(i_2+1)} + \gamma_{j_23}z'_{j_2 i_2}, Z'_{j_2 1} = z'_{j_2 1},$$

$$i_2 = 1, 3, 5, \ldots, n_2-1, j_2 = 2, 4, 6, \ldots, m_1,$$

where $i_2$, $j_2$ and $n_2$ are all positive integers, and $i_2$ is used to represent the column number of the even-numbered rows, $j_2$ is used to represent the row number of even-numbered rows, $n_2$ represents the total number of columns of the pixels of the $j_2$-th row;

$$X'_{j_2\left(\frac{i_2+1}{2}\right)}, Y'_{j_2\left(\frac{i_2+1}{2}\right)} \text{ and } Z'_{j_2\left(\frac{i_2+1}{2}\right)}$$

respectively represent the data signals of the first sub-pixel, the second sub-pixel and the third sub-pixel of the $j_2$-th row and the $$\frac{i_2+1}{2}\text{-th}$$

column in the first region of the second image, $$X'_{j_2\frac{n_2}{2}} \text{ and } Y'_{j_2\frac{n_2}{2}}$$

respectively represent the data signals of the first sub-pixel and the second sub-pixel of the $j_2$-th row and the $$\frac{n_2}{2}\text{-th}$$

column in the first region of the second image, $Z'_{j_2 1}$ represents the data signal of the third sub-pixel of the $j_2$-th row and the first column in the first region of the second image. $x'_{j_2(i_2+1)}$, and $x'_{j_2(i_2+2)}$ and $x'_{j_2 n_2}$ respectively represent the data signals of the first sub-pixels of the $j_2$-th row and the $(i_2+1)$-th column, the $j_2$-th row and the $(i_2+2)$-th column, and the $j_2$-th row and the $n_2$-th column in the first region of the first image. $y'_{j_2(i_2+1)}$, $y'_{j_2(i_2+2)}$ and $y'_{j_2 n_2}$ respectively represent the data signals of the second sub-pixels of the $j_2$-th row and the $(i_2+1)$-th column, the $j_2$-th row and the $(i_2+2)$-th column, and the $j_2$-th row and the $n_2$-th column in the first region of the first image. $z'_{j_2(i_2-1)}$, $z'_{j_2 i_2}$ and $z'_{j_2 1}$ respectively represent the data signals of the third sub-pixels of the $j_2$-th row and the $(i_2-1)$-th column, the $j_2$-th row and the $i_2$-th column, and the $j_2$-th row and the first column in the first region of the first image. $\alpha_{j_2 3}$ and $\alpha_{j_2 4}$ represent conversion coefficients of the first sub-pixels of the $j_2$-th row in the first region of the first image, $\beta_{j_2 3}$ and $\beta_{j_2 4}$ represent conversion coefficients of the second sub-pixels of the $j_2$-th row in the first region of the first image, $\gamma_{j_2 3}$ and $\gamma_{j_2 4}$ represent conversion coefficients of the third sub-pixels of the $j_2$-th row in the first region of the first image, and $\alpha_{j_2 3}+\alpha_{j_2 4}=1$, $\beta_{j_2 3}+\beta_{j_2 4}=1$, $\gamma_{j_2 3}+\gamma_{j_2 4}=1$.

For example, in an example, when the second computer instruction is executed by the second processor 720, following steps may be implemented: generating an original image; determining a first region and a second region in the original image; performing high-definition rendering processing on the first region in the original image by using the image processing device, and performing compression rendering processing on the second region in the original image, so as to generate the first image that is compressed; outputting the first image that is compressed to the display device.

For example, the first region may be a fixation region, and the second region may be a non-fixation region. Therefore, the display system may further include an eye-control device (not shown). The eye-control device may detect the line of sight of human eyes through eye-tracking technology, so as to determine the first region in the original image.

For example, the eye-control device may track the line of sight of the human eyes according to feature changes in eyeballs and the periphery of the eyeballs. The eye-control device may also track the line of sight of the human eyes according to change of an iris angle. The eye-control device may also extract eyeball features by actively projecting light beams such as infrared rays or the like to the iris, thereby achieving tracking the line of sight of the human eyes.

For example, the eye-control device may include hardware equipment such as infrared equipment or image acquiring equipment. The image acquiring equipment may be a camera on an electronic device such as a mobile phone or a computer.

For example, in an example, when the second computer instruction is executed by the second processor 720, following steps may further be implemented: detecting a line of sight of human eyes by using an eye-control device; determining a first region in the original image according to the line of sight of the human eyes. For example, the region in the original image other than the first region is the second region.

For example, the second region of each image (the first image, the second image and the original image) includes a first sub-region, a second sub-region and a third sub-region. The first sub-region is adjacent to the first region in the first direction, the second sub-region is adjacent to the first region in the second direction, and the third sub-region is not adjacent to the first region.

For example, the first direction is perpendicular to the second direction.

For example, the second region in the original image includes a first sub-region, a second sub-region and a third sub-region. The first sub-region in the original image is adjacent to the first region in the original image in the first direction, the second sub-region in the original image is adjacent to the first region in the original image in the second direction, and the third sub-region in the original image is not adjacent to the first region in the original image. The second region in the first image also includes the first sub-region, the second sub-region and the third sub-region, which are in one-to-one correspondence to the first sub-region, the second sub-region and the third sub-region in the second region of the original image.

For example, the first sub-region may include at least one part, the second sub-region may include at least one part, and the third sub-region may also include at least one part. Therefore, the original image may be divided into a plurality of parts. Correspondingly, the first image and the second image may also be divided into a plurality of parts. The embodiments of the present disclosure do not specifically limit the number and arrangement mode of respective parts in the original image, the first image and the second image.

For example, in an example, when the second computer instruction is executed by the second processor 720, following steps may also be implemented: in a first direction, compressing the first sub-region in the original image according to a ratio of 1/F1; in a second direction, compressing the second sub-region in the original image according to a ratio of 1/F2; in the first direction, compressing the third sub-region in the original image according to the ratio of 1/F1, and in the second direction, compressing the third sub-region in the original image according to the ratio of 1/F2.

For example, in an example, when the first computer instruction is executed by the first processor 710, following steps may also be implemented: in a first direction, expanding the first sub-region in the first image according to a ratio of F1/2, and in a second direction, compressing the first sub-region in the first image according to a ratio of 1/2; in the second direction, expanding the second sub-region in the first image according to a ratio of F2/2, and in the first direction, compressing the second sub-region in the first image according to a ratio of 1/2; in the first direction, expanding the third sub-region in the first image according to the ratio of F1/2, and in the second direction, expanding the third sub-region in the first image according to the ratio of F2/2.

For example, the expansion processing and the compression processing both may use an interpolation algorithm.

For example, in an example, when the first computer instruction is executed by the first processor 710, following steps may be implemented: performing pixel conversion on pixels of the second region in the first image by using a third conversion formula.

For example, the third conversion formula may be expressed as:

$$X''_{(2k-1)l} = X''_{(2k)l} = x''_{kl}$$

$$Y''_{(2k-1)l} = Y''_{(2k)l} = y''_{kl}$$

$$Z''_{(2k-1)l} = Z''_{(2k)(l+1)} = z''_{kl}$$

where k, l, $m_2$ and $n_3$ all are integers, $n_3$ represents the total number of columns of pixels in the k-th row, $m_2$ represents the total number of rows of pixels in the first sub-region, the second sub-region and the third sub-region, and k=1,2,3, ..., $m_2$ is used to represent the number of rows, l=1,2,3, ..., $n_3$ is used to represent the number of columns, $X''_{(2k-1)l}$, $Y''_{(2k-1)l}$ and $Z''_{(2k-1)l}$ respectively represent the data signals of the first sub-pixel, the second sub-pixel and the third sub-pixel of the (2k−1)-th row and the l-th column in each sub-region of the second region in the second image. $X''_{(2k)l}$ and $Y''_{(2k)l}$ respectively represent the data signals of the first sub-pixel and the second sub-pixel of the (2k)-th row and the l-th column in each sub-region of the second region in the second image. $Z''_{(2k)(l+1)}$ represents the data signal of the third sub-pixel of the (2k)-th row and the (l+1)-th column in each sub-region of the second region in the second image. $x''_{kl}$, $y''_{kl}$ and $z''_{kl}$ respectively represent data signals of the first sub-pixel, the second sub-pixel and the third sub-pixel of the k-th row and the l-th column in each sub-region of the second region in the first image.

It should be noted that, for the detailed descriptions of the expansion processing, $m_2$, the compression processing, the first conversion formula, the second conversion formula, the third conversion formula, the conversion coefficients of each sub-pixel, and the like, reference may be made to the related descriptions in the embodiments of the image display method, and the repetitions are not described herein again.

At least one embodiment of the present disclosure further provides a computer-readable storage medium, which stores computer instructions adapted to be executed by a processor. When the computer instructions are executed by the processor, following steps may be implemented: acquiring a compressed first image; determining a first region and a second region in the first image; performing a first rendering algorithm on the first region in the first image and performing a second rendering algorithm on the second region in the first image, so as to obtain a second image, where the rendering resolution of the first rendering algorithm is greater than the rendering resolution of the second rendering algorithm; and displaying the second image.

For example, when the computer instructions are executed by the processor, one or more steps in the above-mentioned image display method may also be performed.

For example, in an example of the embodiments of the present disclosure, the computer-readable storage medium may be applied to the display system according to any one of the above-mentioned embodiments. For example, the computer-readable storage medium may be the first memory in the display device of the display system.

For example, for a description of the computer-readable storage medium, reference may be made to the description of the first memory in the embodiment of the display system, and similar descriptions will be omitted herein.

For the present disclosure, the following statements should be noted:

(1) The accompanying drawings involve only the structure(s) in connection with the embodiment(s) of the present disclosure, and other structure(s) can be referred to common design(s).

(2) In case of no conflict, the embodiments of the present disclosure and the features in the embodiment(s) can be combined with each other to obtain new embodiment(s).

What have been described above are only specific implementations of the present disclosure, the protection scope of the present disclosure is not limited thereto, and the protection scope of the present disclosure should be based on the protection scope of the claims.

What is claimed is:

1. An image display method, comprising:
acquiring a first image;
determining a first region and a second region in the first image;
performing a first rendering algorithm on the first region in the first image and performing a second rendering algorithm on the second region in the first image, so as to obtain a second image, wherein a rendering resolution of the first rendering algorithm is greater than a rendering resolution of the second rendering algorithm; and
displaying the second image;
wherein the image display method further comprises:
generating an original image;
determining a first region and a second region in the original image;
performing high-definition rendering processing on the first region in the original image, and performing compression rendering processing on the second region in the original image, so as to generate the first image that is compressed;
outputting the first image that is compressed;
wherein the second region in the original image comprises a first sub-region, a second sub-region and a third sub-region,
the first sub-region in the original image is adjacent to the first region in the original image in a first direction, the second sub-region in the original image is adjacent to the first region in the original image in a second direction, and the third sub-region in the original image is not adjacent to the first region in the original image, the first direction is perpendicular to the second direction,
performing the compression rendering processing on the second region in the original image comprises:
in the first direction, compressing the first sub-region in the original image according to a ratio of 1/F1;

in the second direction, compressing the second sub-region in the original image according to a ratio of 1/F2; and
in the first direction, compressing the third sub-region in the original image according to the ratio of 1/F1, and in the second direction, compressing the third sub-region in the original image according to the ratio of 1/F2,
wherein F1 and F2 are both positive numbers greater than 1.

2. The image display method according to claim 1, wherein sub-pixels in the second image are arranged according to a Bright View 3 array arrangement manner.

3. The image display method according to claim 2, wherein performing the first rendering algorithm on the first region in the first image comprises:
performing pixel conversion on pixels of odd-numbered rows in the first region in the first image by using a first conversion formula; and
performing the pixel conversion on pixels of even-numbered rows in the first region in the first image by using a second conversion formula.

4. The image display method according to claim 3, wherein each of the pixels at least comprises a first sub-pixel, a second sub-pixel and a third sub-pixel,
the first conversion formula is expressed as:

$$X_{j_1\left(\frac{i_1+1}{2}\right)} = \alpha_{j_1 1} x_{j_1 i_1} + \alpha_{j_1 2} x_{j_1(i_1+1)},$$

$$Y_{j_1\left(\frac{i_1+1}{2}\right)} = \beta_{j_1 1} y_{j_1 i_1} + \beta_{j_1 2} y_{j_1(i_1+1)},$$

$$Z_{j_1\left(\frac{i_1+1}{2}\right)} = \gamma_{j_1 1} z_{j_1 i_1} + \gamma_{j_1 2} z_{j_1(i_1+1)},$$

wherein $i_1=1,3,5,\ldots,n_1-1$ represents a column number of the odd-numbered rows, $j_1=1,3,5,\ldots,m_1-1$ represents a row number of the odd-numbered rows, $n_1$ and $m_1$ are both positive integers, $$X_{j_1\left(\frac{i_1+1}{2}\right)}, Y_{j_1\left(\frac{i_1+1}{2}\right)} \text{ and } Z_{j_1\left(\frac{i_1+1}{2}\right)}$$

respectively represent data signals of a first sub-pixel, a second sub-pixel and a third sub-pixel of a $j_1$-th row and a $$\frac{i_1+1}{2} - th$$

column in a first region of the second image,
$x_{j_1 i_1}$, $y_{j_1 i_1}$ and $z_{j_1 i_1}$ respectively represent data signals of a first sub-pixel, a second sub-pixel and a third sub-pixel of a $j_1$-th row and a $i_1$-th column in the first region of the first image, $x_{j_1(i_1+1)}$, $y_{j_1(i_1+1)}$ and $z_{j_1(i_1+1)}$ respectively represent data signals of a first sub-pixel, a second sub-pixel and a third sub-pixel of the $j_1$-th row and a $(i_1+1)$-th column in the first region of the first image,
$\alpha_{j_1 1}$ and $\alpha_{j_1 2}$ represent conversion coefficients of first sub-pixels of the $j_1$-th row in the first region of the first image, $\beta_{j_1 1}$ and $\beta_{j_1 2}$ represent conversion coefficients of second sub-pixels of the $j_1$-th row in the first region of the first image, $\gamma_{j_1 1}$ and $\gamma_{j_1 2}$ represent conversion coefficients of third sub-pixels of the $j_1$-th row in the first region of the first image, and $\alpha_{j_1 1}+\alpha_{j_1 2}=1$, $\beta_{j_1 1}+\beta_{j_1 2}=1$, $\gamma_{j_1 1}+\gamma_{j_1 2}=1$, the second conversion formula is expressed as:

$$X'_{j_2(\frac{i_2+1}{2})} = \alpha_{j_23}x'_{j_2(i_2+1)} + \alpha_{j_24}x'_{j_2(i_2+2)}, X'_{j_2\frac{n_2}{2}} = x'_{j_2n_2},$$

$$i_2 = 1, 3, 5, \ldots, n_2 - 3, j_2 = 2, 4, 6, \ldots, m_1,$$

$$Y'_{j_2(\frac{i_2+1}{2})} = \beta_{j_23}y'_{j_2(i_2+1)} + \beta_{j_24}y'_{j_2(i_2+2)}, Y'_{j_2\frac{n_2}{2}} = y'_{j_2n_2},$$

$$i_2 = 1, 3, 5, \ldots, n_2 - 3, j_2 = 2, 4, 6, \ldots, m_1,$$

$$Z'_{j_2(\frac{i_2+1}{2})} = \gamma_{j_24}z'_{j_2(i_2-1)} + \gamma_{j_23}z'_{j_2i_2}, Z'_{j_21} = z'_{j_21},$$

$$i_2 = 3, 5, \ldots, n_2 - 1, j_2 = 2, 4, 6, \ldots, m_1,$$

wherein $i_2$, $j_2$ and $n_2$ are all positive integers, and $i_2$ represents a column number of the even-numbered rows, $j_2$ represents a row number of the even-numbered rows;

$$X'_{j_2(\frac{i_2+1}{2})}, Y'_{j_2(\frac{i_2+1}{2})} \text{ and } Z'_{j_2(\frac{i_2+1}{2})}$$

respectively represent data signals of a first sub-pixel, a second sub-pixel and a third sub-pixel of a $j_2$-th row and a $$\frac{i_2+1}{2}\text{\_th}$$

column in the first region of the second image, $$X'_{j_2\frac{n_2}{2}} \text{ and } Y'_{j_2\frac{n_2}{2}}$$

represent data signals of a first sub-pixel and a second sub-pixel of the $j_2$-th row and a $$\frac{n_2}{2}\text{\_th}$$

column in the first region of the second image, $Z'_{j_21}$ represents a data signal of a third sub-pixel of the $j_2$-th row and a first column in the first region of the second image, $x'_{j_2(i_2+1)}$, $x'_{j_2(i_2+2)}$ and $x'_{j_2n_2}$ respectively represent data signals of first sub-pixels of the $j_2$-th row and a $(i_2+1)$-th column, the $j_2$-th row and a $(i_2+2)$-th column, and the $j_2$-th row and a $n_2$-th column in the first region of the first image, $y'_{j_2(i_2+1)}$, $y'_{j_2(i_2+2)}$ and $y'_{j_2n_2}$ respectively represent data signals of second sub-pixels of the $j_2$-th row and the $(i_2+1)$-th column, the $j_2$-th row and the $(i_2+2)$-th column, and the $j_2$-th row and the $n_2$-th column in the first region of the first image, $z'_{j_2(i_2-1)}$, $z'_{j_2i_2}$ and $z'_{j_21}$ respectively represent data signals of third sub-pixels of the $j_2$-th row and a $(i_2-1)$-th column, the $j_2$-th row and a $i_2$-th column, and the $j_2$-th row and a first column in the first region of the first image, $\alpha_{j_2 3}$ and $\alpha_{j_2 4}$ represent conversion coefficients of first sub-pixels of the $j_2$-th row in the first region of the first image, $\beta_{j_2 3}$ and $\beta_{j_2 4}$ represent conversion coefficients of second sub-pixels of the $j_2$-th row in the first region of the first image, $\gamma_{j_2 3}$ and $\gamma_{j_2 4}$ represent conversion coefficients of third sub-pixels of the $j_2$-th row in the first region of the first image, and $\alpha_{j_2 3} + \alpha_{j_2 4} = 1$, $\beta_{j_2 3} + \beta_{j_2 4} = 1$, $\gamma_{j_2 3} + \gamma_{j_2 4} = 1$.

5. The image display method according to claim 4, wherein resolution of the second region in the first image is less than resolution of a second region in the second image.

6. The image display method according to claim 1, wherein the second region in the first image also comprises a first sub-region, a second sub-region and a third sub-region, which are in one-to-one correspondence to the first sub-region, the second sub-region and the third sub-region in the second region of the original image, performing the second rendering algorithm on the second region in the first image comprises:
in the first direction, expanding the first sub-region in the first image according to a ratio of F1/2, and in the second direction, compressing the first sub-region in the first image according to a ratio of 1/2;
in the second direction, expanding the second sub-region in the first image according to a ratio of F2/2, and in the first direction, compressing the second sub-region in the first image according to a ratio of 1/2;
in the first direction, expanding the third sub-region in the first image according to the ratio of F1/2, and in the second direction, expanding the third sub-region in the first image according to the ratio of F2/2.

7. The image display method according to claim 6, wherein after the second region in the first image is compressed and expanded,
performing the second rendering algorithm on the second region in the first image further comprises performing pixel conversion on pixels of the second region in the first image by using a third conversion formula,
each of the pixels at least comprises a first sub-pixel, a second sub-pixel and a third sub-pixel,
the third conversion formula is expressed as:

$$X''_{(2k-1)l} = X''_{(2k)l} = x''_{kl},$$

$$Y''_{(2k-1)l} = Y''_{(2k)l} = y''_{kl},$$

$$Z''_{(2k-1)l} = Z''_{(2k)(l+1)} = z''_{kl},$$

wherein $k=1,2,3, \ldots, m_2$ represents a number of rows, $l=1,2,3, \ldots, n_3$ represents a number of columns, k, l, $m_2$ and $n_3$ are positive integers,
$X''_{(2k-1)l}$, $Y''_{(2k-1)l}$ and $Z'_{(2k-1)l}$ respectively represent data signals of a first sub-pixel, a second sub-pixel and a third sub-pixel of a $(2k-1)$-th row and a l-th column in each sub-region of a second region in the second image,
$X''_{(2k)l}$ and $Y''_{(2k)l}$ respectively represent data signals of a first sub-pixel and a second sub-pixel of a $(2k)$-th row and the l-th column in each sub-region of the second region in the second image, $Z''_{(2k)(l+1)}$ represents a data signal of a third sub-pixel of the $(2k)$-th row and a $(l+1)$-th column in each sub-region of the second region in the second image,
$x''_{kl}$, $y''_{kl}$ and $z''_{kl}$ respectively represent data signals of a first sub-pixel, a second sub-pixel and a third sub-pixel of a k-th row and a l-th column in each sub-region of the second region in the first image.

8. The image display method according to claim 1, wherein a resolution of the second region in the first image is less than a resolution of a second region in the second image.

9. A display system, comprising a display device,
wherein the display device comprises a display panel, a first processor and a first memory,
the first memory stores a first computer instruction, and following steps are implemented when the first computer instruction is executed by the first processor:

acquiring a first image;

determining a first region and a second region in the first image;

performing a first rendering algorithm on the first region in the first image and performing a second rendering algorithm on the second region in the first image, so as to obtain a second image, wherein a rendering resolution of the first rendering algorithm is greater than a rendering resolution of the second rendering algorithm; and displaying the second image on the display panel;

wherein the display system further comprises an image processing device, comprising a second processor, a second memory, storing a second computer instruction, when the second computer instruction is executed by the second processor, following steps are implemented:

generating an original image;

determining a first region and a second region in the original image;

performing high-definition rendering processing on the first region in the original image, and performing compression rendering processing on the second region in the original image, so as to generate the first image that is compressed;

outputting the first image that is compressed to the display device;

wherein the second region in the original image comprises a first sub-region, a second sub-region and a third sub-region, the first sub-region in the original image is adjacent to the first region in the original image in a first direction, the second sub-region in the original image is adjacent to the first region in the original image in a second direction, and the third sub-region in the original image is not adjacent to the first region in the original image, the first direction is perpendicular to the second direction, when the second computer instruction is executed by the second processor, following steps are further implemented:

in the first direction, compressing the first sub-region in the original image according to a ratio of 1/F1;

in the second direction, compressing the second sub-region in the original image according to a ratio of 1/F2;

in the first direction, compressing the third sub-region in the original image according to the ratio of 1/F1, and in the second direction, compressing the third sub-region in the original image according to the ratio of 1/F2, wherein F1 and F2 are both positive numbers greater than 1.

10. The display system according to claim 9, wherein sub-pixels in the second image are arranged according to a Bright View 3 array arrangement manner.

11. The display system according to claim 10, wherein when the first computer instruction is executed by the first processor, following steps are further implemented:

performing pixel conversion on pixels of odd-numbered rows in the first region in the first image by using a first conversion formula; and performing the pixel conversion on pixels of even-numbered rows in the first region in the first image by using a second conversion formula.

12. The display system according to claim 11, wherein each of the pixels at least comprises a first sub-pixel, a second sub-pixel and a third sub-pixel, the first conversion formula is expressed as:

$$X_{j_1\left(\frac{i_1+1}{2}\right)} = \alpha_{j_1 1} x_{j_1 i_1} + \alpha_{j_1 2} x_{j_1(i_1+1)},$$

$$Y_{j_1\left(\frac{i_1+1}{2}\right)} = \beta_{j_1 1} y_{j_1 i_1} + \beta_{j_1 2} y_{j_1(i_1+1)},$$

$$Z_{j_1\left(\frac{i_1+1}{2}\right)} = \gamma_{j_1 1} z_{j_1 i_1} + \gamma_{j_1 2} z_{j_1(i_1+1)},$$

wherein $i_1=1,3,5,\ldots,n_1-1$ represents a column number of the odd-numbered rows, $j_1=1,3,5,\ldots,m_1-1$ represents a row number of odd-numbered rows, $n_1$ represents a total number of columns of pixels of a $j_1$-th row, $m_1$ represents a total number of rows of pixels in the first region of the first image, $n_1$ and $m_1$ are both positive integers, $$X_{j_1\left(\frac{i_1+1}{2}\right)}, Y_{j_1\left(\frac{i_1+1}{2}\right)} \text{ and } Z_{j_1\left(\frac{i_1+1}{2}\right)}$$

respectively represent data signals of a first sub-pixel, a second sub-pixel and a third sub-pixel of a $j_1$-th row and a $$\frac{i_1+1}{2}-th$$

column in a first region of the second image, $x_{j_1 i_1}$, $y_{j_1 i_1}$ and $z_{j_1 i_1}$ respectively represent data signals of a first sub-pixel, a second sub-pixel and a third sub-pixel of a $j_1$-th row and a $i_1$-th column in the first region of the first image, $x_{j_1 i_1}$, $y_{j_1 i_1}$ and $z_{j_1 i_1}$ respectively represent data signals of a first sub-pixel, a second sub-pixel and a third sub-pixel of the $j_1$-th row and a $(i_1+1)$-th column in the first region of the first image, $\alpha_{j_1 1}$ and $\alpha_{j_1 2}$ represent conversion coefficients of first sub-pixels of the $j_1$-th row in the first region of the first image, $\beta_{j_1 1}$ and $\beta_{j_1 2}$ represent conversion coefficients of second sub-pixels of the $j_1$-th row in the first region of the first image, $\gamma_{j_1 1}$ and $\gamma_{j_1 2}$ represent conversion coefficients of third sub-pixels of the $j_1$-th row in the first region of the first image, and $\alpha_{j_1 1}+\alpha_{j_1 2}=1$, $\beta_{j_1 1}+\beta_{j_1 2}=1$, $\gamma_{j_1 1}+\gamma_{j_1 2}=1$, the second conversion formula is expressed as:

$$X'_{j_2\left(\frac{i_2+1}{2}\right)} = \alpha_{j_2 3} x'_{j_2(i_2+1)} + \alpha_{j_2 4} x'_{j_2(i_2+2)}, X'_{j_2 \frac{n_2}{2}} = x'_{j_2 n_2},$$

$i_2 = 1, 3, 5, \ldots, n_2-3, j_2 = 2, 4, 6, \ldots, m_1,$ $$Y'_{j_2\left(\frac{i_2+1}{2}\right)} = \beta_{j_2 3} y'_{j_2(i_2+1)} + \beta_{j_2 4} y'_{j_2(i_2+2)}, Y'_{j_2 \frac{n_2}{2}} = y'_{j_2 n_2},$$

$i_2 = 1, 3, 5, \ldots, n_2-3, j_2 = 2, 4, 6, \ldots, m_1,$ $$Z'_{j_2\left(\frac{i_2+1}{2}\right)} = \gamma_{j_2 4} z'_{j_2(i_2-1)} + \gamma_{j_2 3} z'_{j_2 i_2}, Z'_{j_2 1} = z'_{j_2 1},$$

$i_2 = 3, 5, \ldots, n_2-1, j_2 = 2, 4, 6, \ldots, m_1,$ wherein $i_2$, $j_2$ and $n_2$ are all positive integers, and $l_2$ represents a column number of the even-numbered rows, $j_2$ represents a row number of the even-numbered rows, $n_2$ represents a total number of columns of pixels of a $j_2$-th row;

$X'_{j_2(\frac{i_2+1}{2})}$, $Y'_{j_2(\frac{i_2+1}{2})}$ and $Z'_{j_2(\frac{i_2+1}{2})}$ respectively represent data signals of a first sub-pixel, a second sub-pixel and a third sub-pixel of a $j_2$-th row and a $\frac{i_2+1}{2}$_th column in the first region of the second image, $X'_{j_2\frac{n_2}{2}}$ and $Y'_{j_2\frac{n_2}{2}}$ respectively represent data signals of a first sub-pixel and a second sub-pixel of the $j_2$-th row and a $\frac{n_2}{2}$_th column in the first region of the second image, $Z'_{j_2 1}$ represents a data signal of a third sub-pixel of the $j_2$-th row and a first column in the first region of the second image,
$x'_{j_2(i_2+1)}$, $x'_{j_2(i_2+2)}$ and $x'_{j_2 n_2}$ respectively represent data signals of first sub-pixels of a $j_2$-th row and a $(i_2+1)$-th column, the $j_2$-th row and a $(i_2+2)$-th column, and the $j_2$-th row and a $n_2$-th column in the first region of the first image, $y'_{j_2(i_2+1)}$, $y'_{j_2(i_2+2)}$ and $y'_{j_2 n_2}$ respectively represent data signals of second sub-pixels of the $j_2$-th row and the $(i_2+1)$-th column, the $j_2$-th row and the $(i_2+2)$-th column, and the $j_2$-th row and the $n_2$-th column in the first region of the first image, $z'_{j_2(i_2+1)}$, $z'_{j_2(i_2+2)}$ and $z'_{j_2 n_2}$ respectively represent data signals of third sub-pixels of the $j_2$-th row and a $(i_2-1)$-th column, the $j_2$-th row and a $i_2$-th column, and the $j_2$-th row and a first column in the first region of the first image,
$\alpha_{j_2 3}$ and $\alpha_{j_2 4}$ represent conversion coefficients of first sub-pixels of the $j_2$-th row in the first region of the first image, $\beta_{j_2 3}$ and $\beta_{j_2 4}$ represent conversion coefficients of second sub-pixels of the $j_2$-th row in the first region of the first image, $\gamma_{j_2 3}$ and $\gamma_{j_2 4}$ represent conversion coefficients of third sub-pixels of the $j_2$-th row in the first region of the first image, and $\alpha_{j_2 3}+\alpha_{j_2 4}=1$, $\beta_{j_2 3}+\beta_{j_2 4}=1$, $\gamma_{j_2 3}+\gamma_{j_2 4}=1$.

13. The display system according to claim 9, wherein the second region in the first image also comprises a first sub-region, a second sub-region and a third sub-region, which are in one-to-one correspondence to the first sub-region, the second sub-region and the third sub-region in the second region of the original image,
when the first computer instruction is executed by the first processor, following steps are implemented:
in the first direction, expanding the first sub-region in the first image according to a ratio of F1/2, and in the second direction, compressing the first sub-region in the first image according to a ratio of 1/2;
in the second direction, expanding the second sub-region in the first image according to a ratio of F2/2, and in the first direction, compressing the second sub-region in the first image according to a ratio of 1/2;
in the first direction, expanding the third sub-region in the first image according to the ratio of F1/2, and in the second direction, expanding the third sub-region in the first image according to the ratio of F2/2.

14. The display system according to claim 13, wherein when the first computer instruction is executed by the first processor, following steps are further implemented: performing pixel conversion on pixels of the second region in the first image by using a third conversion formula,
each of the pixels at least comprises a first sub-pixel, a second sub-pixel and a third sub-pixel,
the third conversion formula is expressed as:

$X''_{(2k-1)l}=X''_{(2k)l}=x''_{kl}$, $Y''_{(2k-1)l}=Y''_{(2k)l}=y''_{kl}$, $Z''_{(2k-1)l}=Z''_{(2k)(l+1)}=z''_{kl}$, wherein k=1,2,3, . . . , $m_2$ represents a number of rows, l=1,2,3, . . . , $n_3$ represents a number of columns, $n_3$ represents a total number of columns of pixels of a k-th row, $m_2$ represents a total number of rows of pixels in the first sub-region, the second sub-region or the third sub-region, k, l, $m_2$ and $n_3$ are positive integers,
$X''_{(2k-1)l}$, $Y''_{(2k-1)l}$ and $Z''_{(2k-1)l}$ respectively represent data signals of a first sub-pixel, a second sub-pixel and a third sub-pixel of the (2k−1)-th row and a l-th column in each sub-region of a second region in the second image, $X''_{(2k)l}$ and $Y''_{(2k)l}$ respectively represent data signals of a first sub-pixel and a second sub-pixel of a (2k)-th row and the l-th column in each sub-region of the second region in the second image, $Z''_{(2k)(l+1)}$ represents a data signal of a third sub-pixel of the (2k)-th row and a (l+1)-th column in each sub-region of the second region in the second image,
$x''_{kl}$, $y''_{kl}$ and $z''_{kl}$ respectively represent data signals of a first sub-pixel, a second sub-pixel and a third sub-pixel of a k-th row and a l-th column in each sub-region of the second region in the first image.

15. The display system according to claim 9, wherein a resolution of the second region in the first image is less than a resolution of a second region in the second image.

16. A non-transitory computer-readable storage medium, on which a computer instruction is stored,
wherein the image display method according to claim 1 is performed when the computer instruction is executed by a processor.

17. An image display method, comprising:
acquiring a first image;
determining a first region and a second region in the first image;
performing a first rendering algorithm on the first region in the first image and performing a second rendering algorithm on the second region in the first image, so as to obtain a second image, wherein a rendering resolution of the first rendering algorithm is greater than a rendering resolution of the second rendering algorithm; and
displaying the second image;
wherein sub-pixels in the second image are arranged according to a Bright View 3 array arrangement manner;
performing the first rendering algorithm on the first region in the first image comprises:
performing pixel conversion on pixels of odd-numbered rows in the first region in the first image by using a first conversion formula; and
performing the pixel conversion on pixels of even-numbered rows in the first region in the first image by using a second conversion formula;

wherein each of the pixels at least comprises a first sub-pixel, a second sub-pixel and a third sub-pixel, the first conversion formula is expressed as:

$$X_{j_1\left(\frac{i_1+1}{2}\right)} = \alpha_{j_1 1} x_{j_1 i_1} + \alpha_{j_1 2} x_{j_1(i_1+1)},$$

$$Y_{j_1\left(\frac{i_1+1}{2}\right)} = \beta_{j_1 1} y_{j_1 i_1} + \beta_{j_1 2} y_{j_1(i_1+1)},$$

$$Z_{j_1\left(\frac{i_1+1}{2}\right)} = \gamma_{j_1 1} z_{j_1 i_1} + \gamma_{j_1 2} z_{j_1(i_1+1)},$$

wherein $i_1=1,3,5,\ldots,n_1-1$ represents a column number of the odd-numbered rows, $j_1=1,3,5,\ldots,m_1-1$ represents a row number of the odd-numbered rows, $n_1$ and $m_1$ are both positive integers, $$X_{j_1\left(\frac{i_1+1}{2}\right)}, Y_{j_1\left(\frac{i_1+1}{2}\right)} \text{ and } Z_{j_1\left(\frac{i_1+1}{2}\right)}$$

respectively represent data signals of a first sub-pixel, a second sub-pixel and a third sub-pixel of a $j_1$-th row and a $$\frac{i_1+1}{2} - th$$

column in a first region of the second image, $x_{j_1 i_1}$, $y_{j_1 i_1}$ and $z_{j_1 i_1}$ respectively represent data signals of a first sub-pixel, a second sub-pixel and a third sub-pixel of a $j_1$-th row and a $i_1$-th column in the first region of the first image, $x_{j_1(i_1+1)}$, $y_{j_1(i_1+1)}$ and $z_{j_1(i_1+1)}$ respectively represent data signals of a first sub-pixel, a second sub-pixel and a third sub-pixel of the $j_1$-th row and a $(i_1+1)$-th column in the first region of the first image, $\alpha_{j_1 1}$ and $\alpha_{j_1 2}$ represent conversion coefficients of first sub-pixels of the $j_1$-th row in the first region of the first image, $\beta_{j_1 1}$ and $\beta_{j_1 2}$ represent conversion coefficients of second sub-pixels of the $j_1$-th row in the first region of the first image, $\gamma_{j_1 1}$ and $\gamma_{j_1 2}$ represent conversion coefficients of third sub-pixels of the $j_1$-th row in the first region of the first image, and $\alpha_{j_1 1}+\alpha_{j_1 2}=1$, $\beta_{j_1 1}+\beta_{j_1 2}=1$, $\gamma_{j_1 1}+\gamma_{j_1 2}=1$, the second conversion formula is expressed as:

$$X'_{j_2\left(\frac{i_2+1}{2}\right)} = \alpha_{j_2 3} x'_{j_2(i_2+1)} + \alpha_{j_2 4} x'_{j_2(i_2+2)}, X'_{j_2\frac{n_2}{2}} = x'_{j_2 n_2},$$

$i_2 = 1, 3, 5, \ldots, n_2 - 3, j_2 = 2, 4, 6, \ldots, m_1,$ $$Y'_{j_2\left(\frac{i_2+1}{2}\right)} = \beta_{j_2 3} y'_{j_2(i_2+1)} + \beta_{j_2 4} y'_{j_2(i_2+2)}, Y'_{j_2\frac{n_2}{2}} = y'_{j_2 n_2},$$

$i_2 = 1, 3, 5, \ldots, n_2 - 3, j_2 = 2, 4, 6, \ldots, m_1,$

-continued $$Z'_{j_2\left(\frac{i_2+1}{2}\right)} = \gamma_{j_2 4} z'_{j_2(i_2-1)} + \gamma_{j_2 3} z'_{j_2 i_2}, Z'_{j_2 1} = z'_{j_2 1},$$

$i_2 = 3, 5, \ldots, n_2 - 1, j_2 = 2, 4, 6, \ldots, m_1,$ wherein $i_2$, $j_2$ and $n_2$ are all positive integers, and $i_2$ represents a column number of the even-numbered rows, $j_2$ represents a row number of the even-numbered rows;

$$X'_{j_2\left(\frac{i_2+1}{2}\right)}, Y'_{j_2\left(\frac{i_2+1}{2}\right)} \text{ and } Z'_{j_2\left(\frac{i_2+1}{2}\right)}$$

respectively represent data signals of a first sub-pixel, a second sub-pixel and a third sub-pixel of a $j_2$-th row and a $$\frac{i_2+1}{2} \_th$$

column in the first region of the second image, $$X'_{j_2\frac{n_2}{2}} \text{ and } Y'_{j_2\frac{n_2}{2}}$$

represent data signals of a first sub-pixel and a second sub-pixel of the $j_2$-th row and a $$\frac{n_2}{2} \_th$$

column in the first region of the second image, $Z'_{j_2 1}$ represents a data signal of a third sub-pixel of the $j_2$-th row and a first column in the first region of the second image, $x'_{j_2(i_2+1)}$, $x'_{j_2(i_2+2)}$ and $x'_{j_2 n_2}$ respectively represent data signals of first sub-pixels of the $j_2$-th row and a $(i_2+1)$-th column, the $j_2$-th row and a $(i_2+2)$-th column, and the $j_2$-th row and a $n_2$-th column in the first region of the first image, $y'_{j_2(i_2+1)}$, $y'_{j_2(i_2+2)}$ and $y'_{j_2 n_2}$ respectively represent data signals of second sub-pixels of the $j_2$-th row and the $(i_2+1)$-th column, the $j_2$-th row and the $(i_2+2)$-th column, and the $j_2$-th row and the $n_2$-th column in the first region of the first image, $z'_{j_2(i_2-1)}$, $z'_{j_2 i_2}$ and $z'_{j_2 1}$ respectively represent data signals of third sub-pixels of the $j_2$-th row and a $(i_2-1)$-th column, the $j_2$-th row and a $i_2$-th column, and the $j_2$-th row and a first column in the first region of the first image, $\alpha_{j_2 3}$ and $\alpha_{j_2 4}$ represent conversion coefficients of first sub-pixels of the $j_2$-th row in the first region of the first image, $\beta_{j_2 3}$ and $\beta_{j_2 4}$ represent conversion coefficients of second sub-pixels of the $j_2$-th row in the first region of the first image, $\beta_{j_2 3}$ and $\beta_{j_2 4}$ represent conversion coefficients of third sub-pixels of the $j_2$-th row in the first region of the first image, and $\alpha_{j_2 3}+\alpha_{j_2 4}=1$, $\beta_{j_2 3}+\beta_{j_2 4}=1$, $\gamma_{j_2 3}+\gamma_{j_2 4}=1$.

* * * * *